United States Patent
Sambonsugi

(10) Patent No.: US 8,625,007 B2
(45) Date of Patent: Jan. 7, 2014

(54) IMAGE PICKUP APPARATUS, IMAGE COMBINATION METHOD, AND COMPUTER PROGRAM

(75) Inventor: Hideaki Sambonsugi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 8 days.

(21) Appl. No.: 13/533,302

(22) Filed: Jun. 26, 2012

(65) Prior Publication Data

US 2013/0002910 A1    Jan. 3, 2013

(30) Foreign Application Priority Data

Jun. 30, 2011 (JP) .................. 2011-146322

(51) Int. Cl.
H04N 9/64 (2006.01)

(52) U.S. Cl.
USPC ........................................... 348/246

(58) Field of Classification Search
USPC ........................ 348/241, 246, 247
See application file for complete search history.

(56) References Cited

U.S. PATENT DOCUMENTS

| | | | |
|---|---|---|---|
| 7,362,916 B2 * | 4/2008 | Yamazaki | 382/275 |
| 7,872,680 B2 * | 1/2011 | Misawa | 348/247 |
| 7,973,977 B2 * | 7/2011 | Thurston, III | 358/3.26 |
| 8,081,232 B2 * | 12/2011 | Sakamoto et al. | 348/222.1 |
| 2008/0259188 A1* | 10/2008 | Kobayashi et al. | 348/247 |

FOREIGN PATENT DOCUMENTS

| | | |
|---|---|---|
| JP | 2004-242103 | 8/2004 |
| JP | 2008-306508 | 12/2008 |

* cited by examiner

Primary Examiner — Timothy J Henn
(74) Attorney, Agent, or Firm — Cowan, Liebowitz & Latman, P.C.

(57) ABSTRACT

An image pickup apparatus arranged to derive a change amount of an image B to an image A as combination position information, on the basis of which the image B is combined to the image A by shifting a position of the image B to generate a combined image D and a position of pixel defect information of the image B is changed, and synthesize pixel defect information of the image A and pixel defect information of the image B after the change to generate pixel defect information of the combined image D such that the pixel defect information in which a detection level corresponding to ISO100 is deleted from the pixel defect information of the combined image D and a detection level of pixel defect information of the pixel shown by same addresses is raised.

18 Claims, 35 Drawing Sheets

PIXEL DEFECT POSITION

PIXEL DEFECT INFORMATION

| X ADDRESS | Y ADDRESS | DETECTION LEVEL |
|---|---|---|
| 1 | 1 | 200 |
| 2 | 10 | 100 |
| 3 | 8 | 100 |
| 5 | 3 | 200 |
| 5 | 7 | 200 |
| 7 | 4 | 100 |
| 7 | 9 | 200 |
| 8 | 1 | 100 |
| 9 | 11 | 100 |
| ⋮ | ⋮ | ⋮ |

| G11 | R12 | G13 |
|---|---|---|
| B21 | G22 | B23 |
| G31 | R32 | G33 |

FIG. 6A
IMAGE A
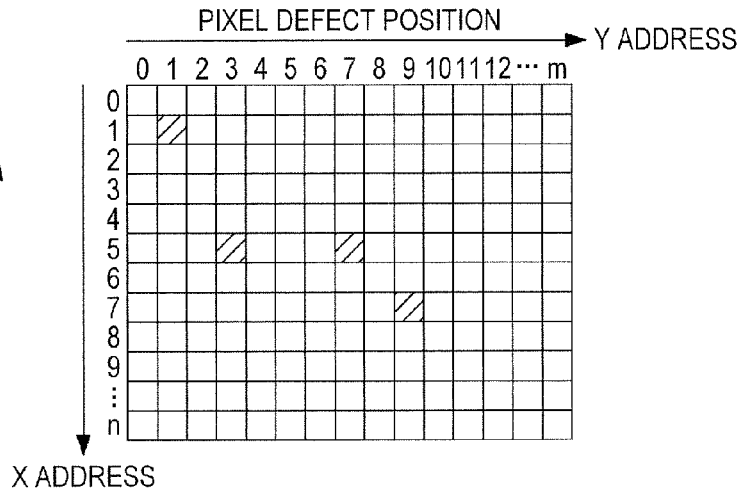
FIG. 6B
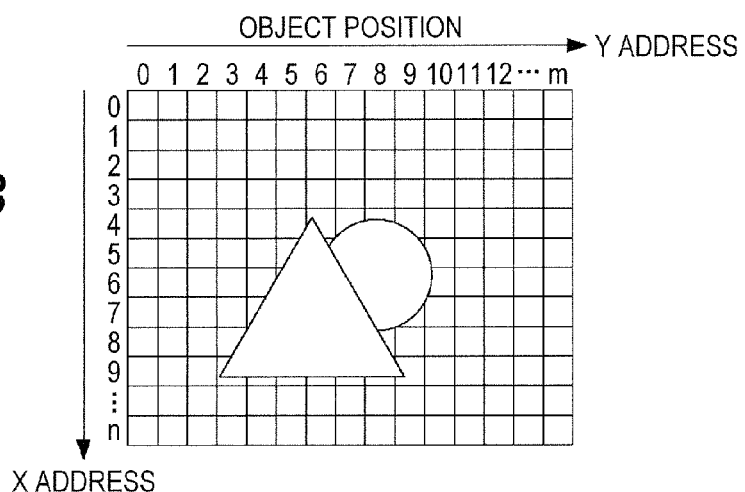
FIG. 6C
PIXEL DEFECT INFORMATION
| X ADDRESS | Y ADDRESS | DETECTION LEVEL |
|---|---|---|
| 1 | 1 | 200 |
| 2 | 10 | 100 |
| 3 | 8 | 100 |
| 5 | 3 | 200 |
| 5 | 7 | 200 |
| 7 | 4 | 100 |
| 7 | 9 | 200 |
| 8 | 1 | 100 |
| 9 | 11 | 100 |
| ⋮ | ⋮ | ⋮ |

FIG. 7A
IMAGE B
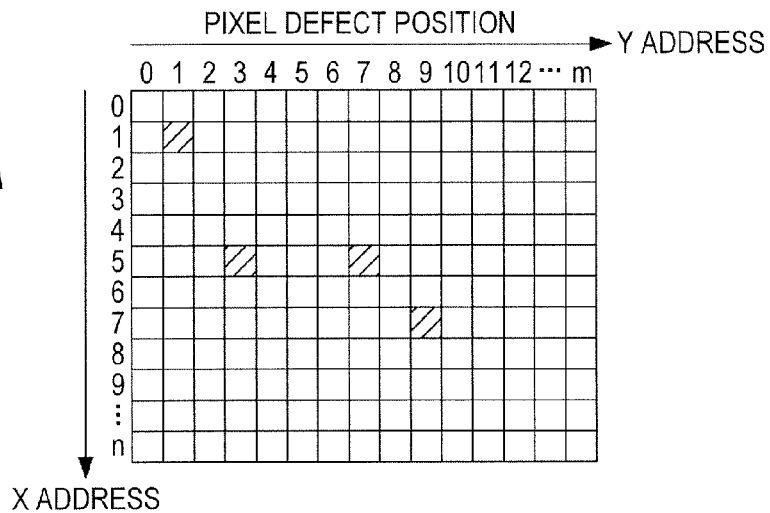
FIG. 7B
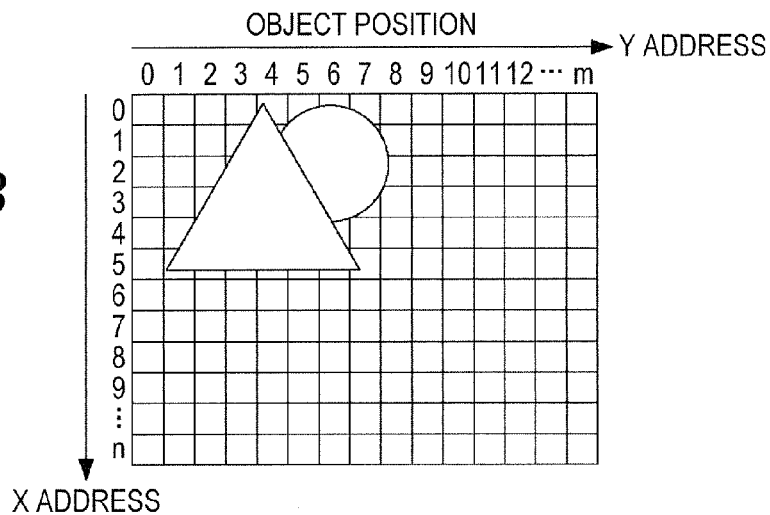
FIG. 7C
PIXEL DEFECT INFORMATION
| X ADDRESS | Y ADDRESS | DETECTION LEVEL |
|---|---|---|
| 1 | 1 | 200 |
| 2 | 10 | 100 |
| 3 | 8 | 100 |
| 5 | 3 | 200 |
| 5 | 7 | 200 |
| 7 | 4 | 100 |
| 7 | 9 | 200 |
| 8 | 1 | 100 |
| 9 | 11 | 100 |
| ⋮ | ⋮ | ⋮ |

FIG. 8A
IMAGE C
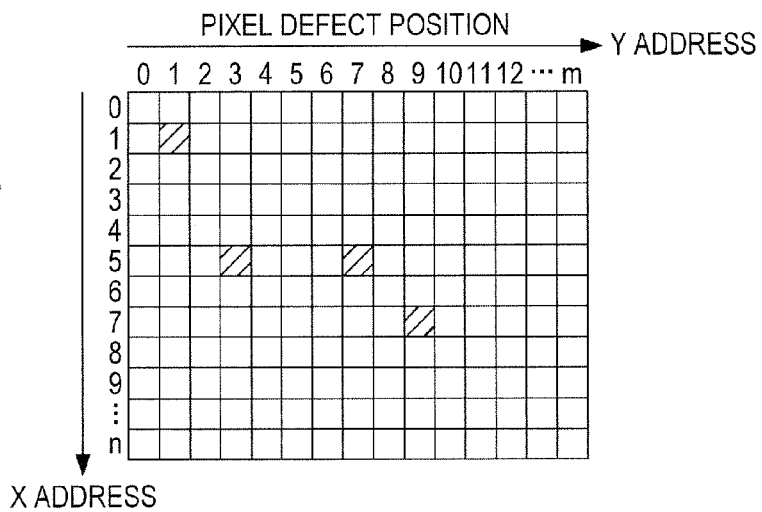
FIG. 8B
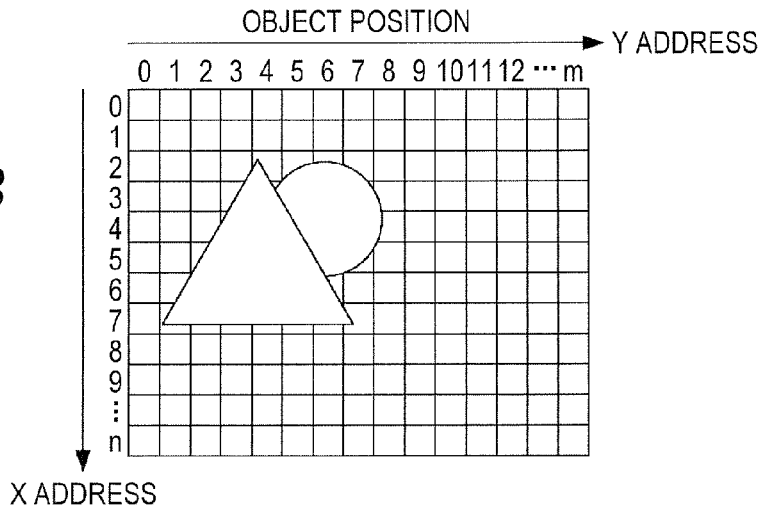
FIG. 8C
PIXEL DEFECT INFORMATION
| X ADDRESS | Y ADDRESS | DETECTION LEVEL |
|---|---|---|
| 1 | 1 | 200 |
| 2 | 10 | 100 |
| 3 | 8 | 100 |
| 5 | 3 | 200 |
| 5 | 7 | 200 |
| 7 | 4 | 100 |
| 7 | 9 | 200 |
| 8 | 1 | 100 |
| 9 | 11 | 100 |
| ⋮ | ⋮ | ⋮ |

FIG. 9A
IMAGE B
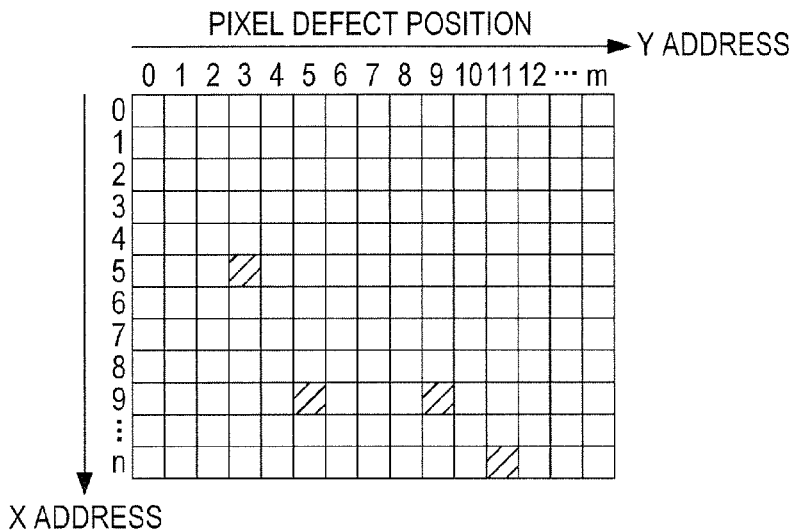
FIG. 9B
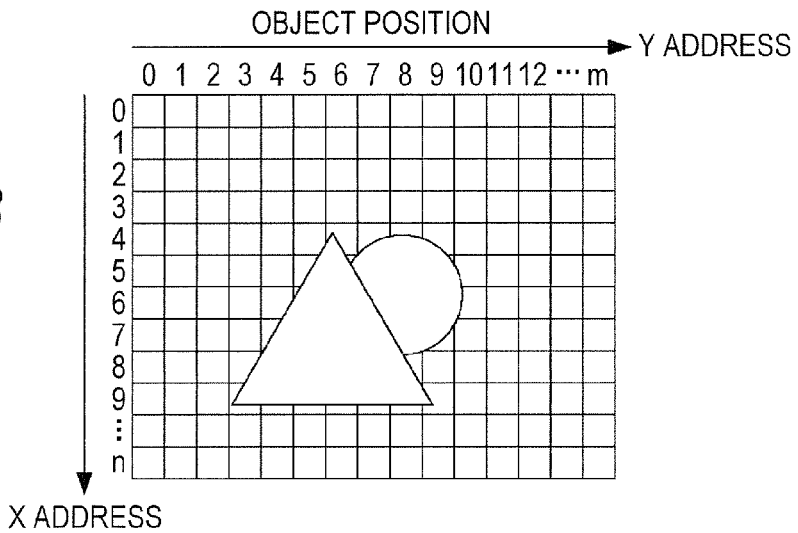
FIG. 9C
PIXEL DEFECT INFORMATION
| X ADDRESS | Y ADDRESS | DETECTION LEVEL |
|---|---|---|
| 5 | 3 | 200 |
| 6 | 12 | 100 |
| 7 | 10 | 100 |
| 9 | 5 | 200 |
| 9 | 9 | 200 |
| 11 | 6 | 100 |
| 11 | 11 | 200 |
| 12 | 3 | 100 |
| 13 | 13 | 100 |
| ⋮ | ⋮ | ⋮ |

FIG. 10

PIXEL DEFECT INFORMATION

| X ADDRESS | Y ADDRESS | DETECTION LEVEL |
| --- | --- | --- |
| 1 | 1 | 200 |
| 2 | 10 | 100 |
| 3 | 8 | 100 |
| 5 | 3 | 200 |
| 5 | 3 | 200 |
| 5 | 7 | 200 |
| 6 | 12 | 100 |
| 7 | 4 | 100 |
| 7 | 9 | 200 |
| 7 | 10 | 100 |
| 8 | 1 | 100 |
| 9 | 5 | 200 |
| 9 | 9 | 200 |
| 9 | 11 | 100 |
| 11 | 6 | 100 |
| 11 | 11 | 200 |
| 12 | 3 | 100 |
| 13 | 13 | 100 |
| ⋮ | ⋮ | ⋮ |

FIG. 11A
COMBINED IMAGE D
(COMBINATION OF
IMAGES A AND B)
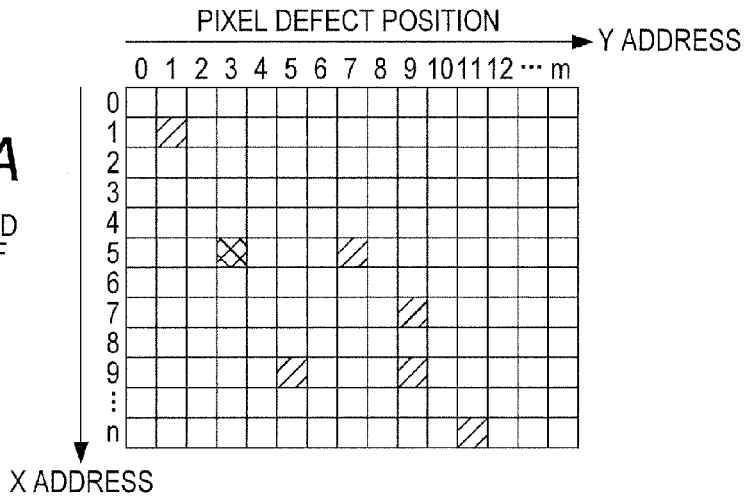
FIG. 11B
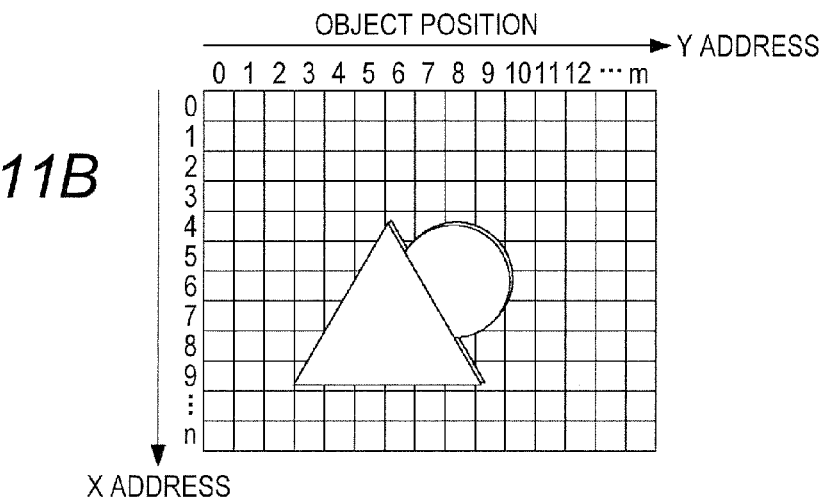
FIG. 11C
PIXEL DEFECT INFORMATION
| X ADDRESS | Y ADDRESS | DETECTION LEVEL |
|---|---|---|
| 1 | 1 | 200 |
| 5 | 3 | 100 |
| 5 | 7 | 200 |
| 7 | 9 | 200 |
| 9 | 5 | 200 |
| 9 | 9 | 200 |
| 11 | 11 | 200 |
| ⋮ | ⋮ | ⋮ |

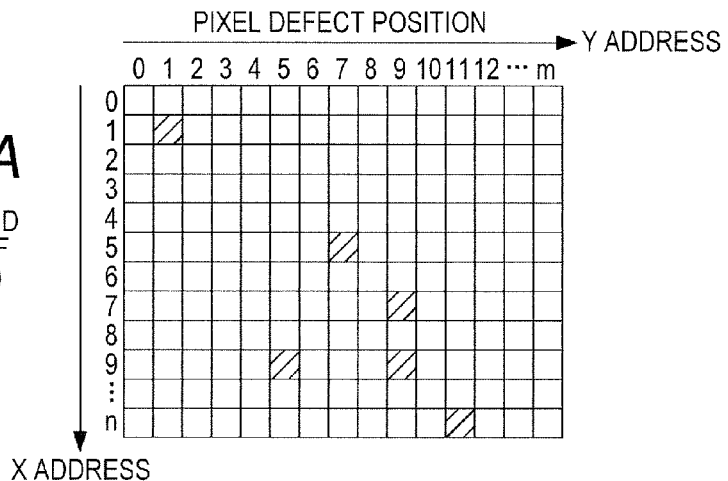
FIG. 12A
COMBINED IMAGE D
(COMBINATION OF
IMAGES A AND B)
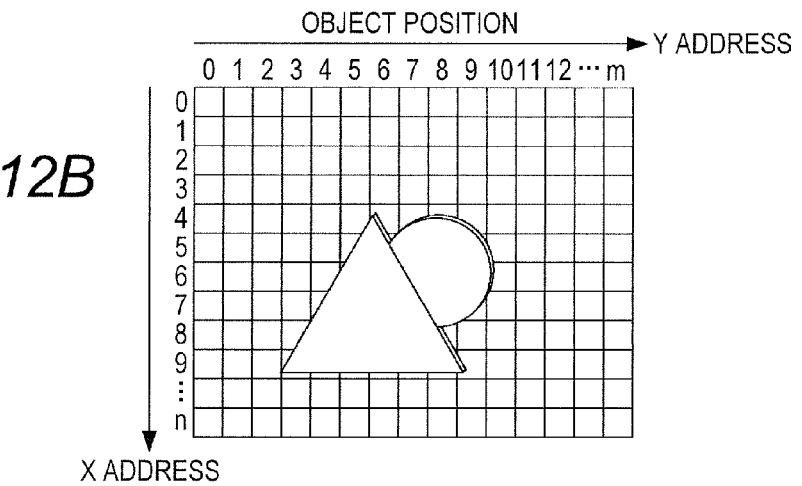
FIG. 12B
PIXEL DEFECT INFORMATION
FIG. 12C
| X ADDRESS | Y ADDRESS | DETECTION LEVEL |
|---|---|---|
| 1 | 1 | 200 |
| 5 | 3 | 100 |
| 5 | 7 | 200 |
| 7 | 9 | 200 |
| 9 | 5 | 200 |
| 9 | 9 | 200 |
| 11 | 11 | 200 |
| ⋮ | ⋮ | ⋮ |

FIG. 13A
IMAGE C
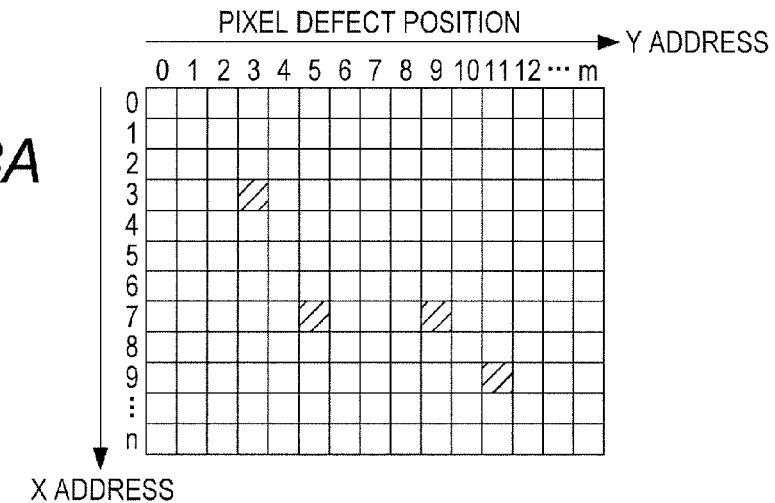
FIG. 13B
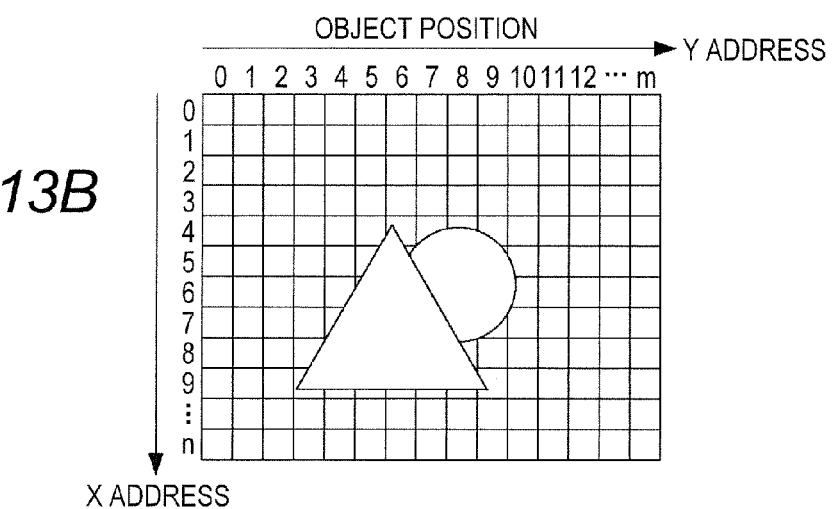
FIG. 13C
PIXEL DEFECT INFORMATION
| X ADDRESS | Y ADDRESS | DETECTION LEVEL |
|---|---|---|
| 3 | 3 | 200 |
| 4 | 12 | 100 |
| 5 | 10 | 100 |
| 7 | 5 | 200 |
| 7 | 9 | 200 |
| 9 | 6 | 100 |
| 9 | 11 | 200 |
| 11 | 3 | 100 |
| 11 | 13 | 100 |
| ⋮ | ⋮ | ⋮ |

FIG. 14

PIXEL DEFECT INFORMATION

| X ADDRESS | Y ADDRESS | DETECTION LEVEL |
|---|---|---|
| 1 | 1 | 200 |
| 3 | 3 | 200 |
| 4 | 12 | 100 |
| 5 | 3 | 100 |
| 5 | 7 | 200 |
| 5 | 10 | 100 |
| 7 | 5 | 200 |
| 7 | 9 | 200 |
| 7 | 9 | 200 |
| 9 | 5 | 200 |
| 9 | 6 | 100 |
| 9 | 9 | 200 |
| 9 | 11 | 200 |
| 11 | 3 | 100 |
| 11 | 11 | 200 |
| 11 | 13 | 100 |
| ⋮ | ⋮ | ⋮ |

FIG. 15A
COMBINED IMAGE E
(COMBINATION OF
IMAGES A, B AND C)
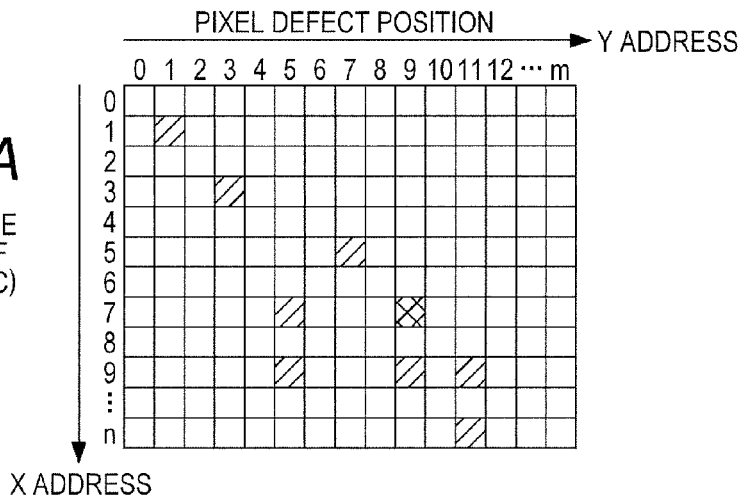
FIG. 15B
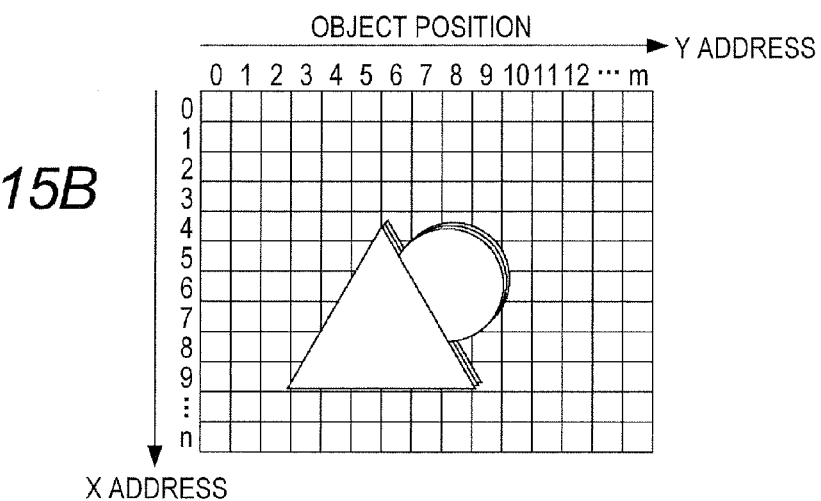
FIG. 15C
PIXEL DEFECT INFORMATION
| X ADDRESS | Y ADDRESS | DETECTION LEVEL |
|---|---|---|
| 1 | 1 | 200 |
| 3 | 3 | 200 |
| 5 | 7 | 200 |
| 7 | 5 | 200 |
| 7 | 9 | 100 |
| 9 | 5 | 200 |
| 9 | 9 | 200 |
| 9 | 11 | 200 |
| 11 | 11 | 200 |
| ⋮ | ⋮ | ⋮ |

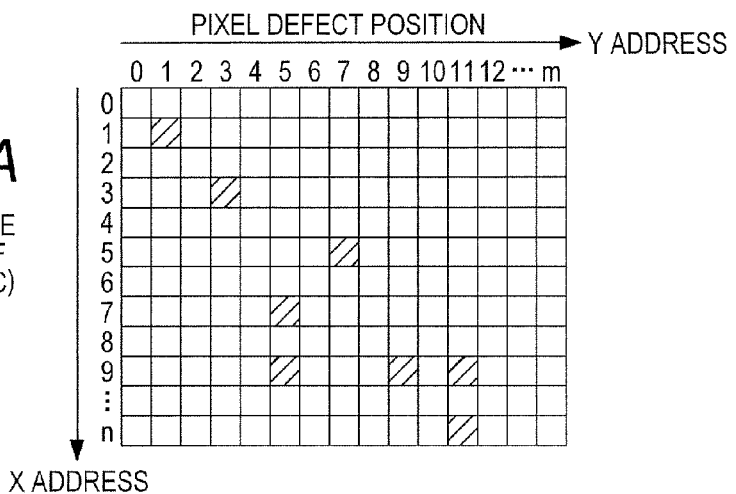
FIG. 16A
COMBINED IMAGE E
(COMBINATION OF
IMAGES A, B AND C)
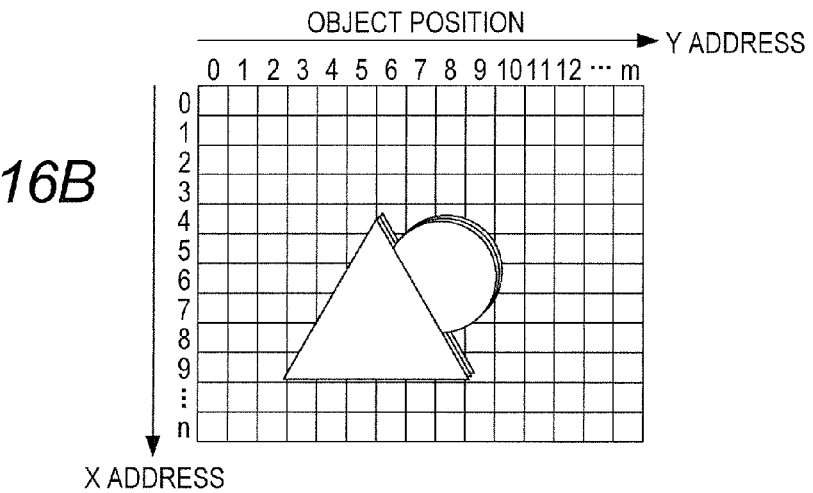
FIG. 16B
PIXEL DEFECT INFORMATION
FIG. 16C
| X ADDRESS | Y ADDRESS | DETECTION LEVEL |
|---|---|---|
| 1 | 1 | 200 |
| 3 | 3 | 200 |
| 5 | 7 | 200 |
| 7 | 5 | 200 |
| 7 | 9 | 100 |
| 9 | 5 | 200 |
| 9 | 9 | 200 |
| 9 | 11 | 200 |
| 11 | 11 | 200 |
| ⋮ | ⋮ | ⋮ |

| X ADDRESS | Y ADDRESS | DETECTION LEVEL |
|---|---|---|
| 1 | 1 | 200 |
| 2 | 10 | 100 |
| 3 | 8 | 400 |
| 5 | 4 | 200 |
| 5 | 6 | 1600 |
| 7 | 9 | 200 |
| 8 | 1 | 100 |
| 9 | 4 | 800 |
| 9 | 11 | 400 |
| ⋮ | ⋮ | ⋮ |

FIG. 21A
IMAGE F
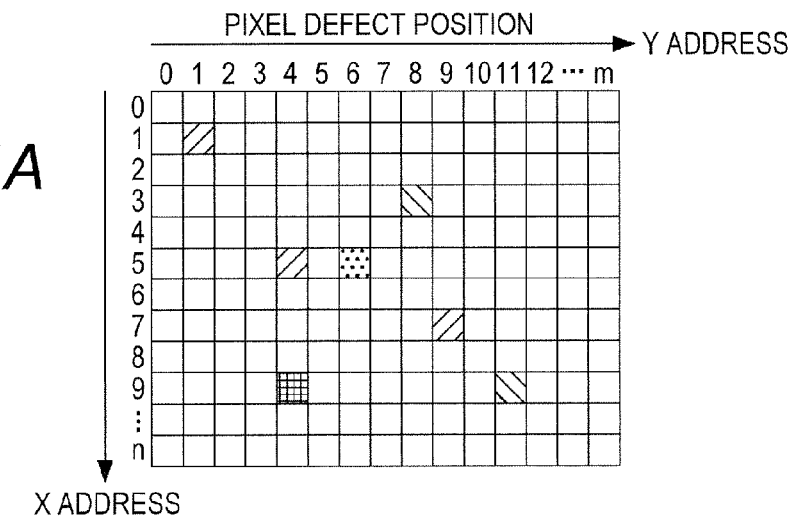
FIG. 21B
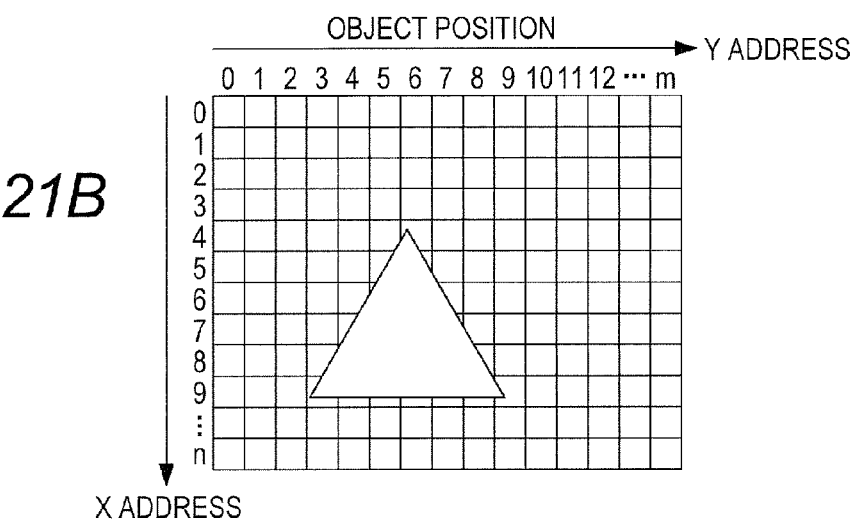
FIG. 21C
PIXEL DEFECT INFORMATION
| X ADDRESS | Y ADDRESS | DETECTION LEVEL |
|---|---|---|
| 1 | 1 | 200 |
| 2 | 10 | 100 |
| 3 | 8 | 400 |
| 5 | 4 | 200 |
| 5 | 6 | 1600 |
| 7 | 9 | 200 |
| 8 | 1 | 100 |
| 9 | 4 | 800 |
| 9 | 11 | 400 |
| ⋮ | ⋮ | ⋮ |

FIG. 22A
IMAGE G
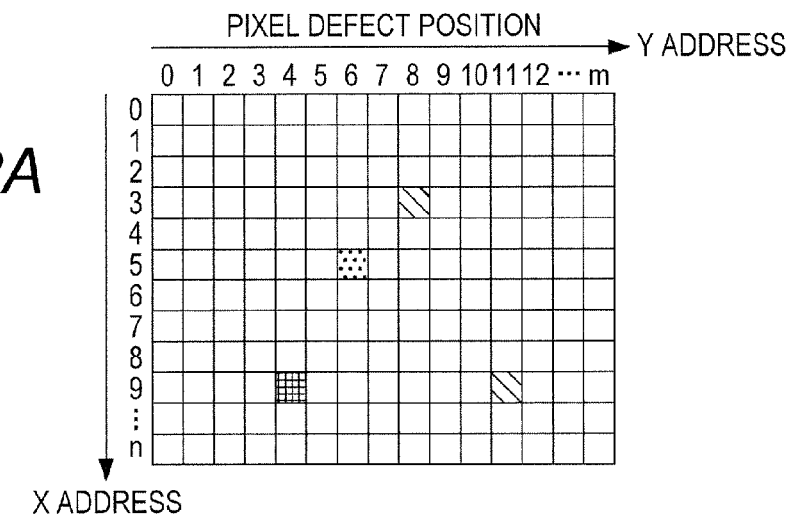
FIG. 22B
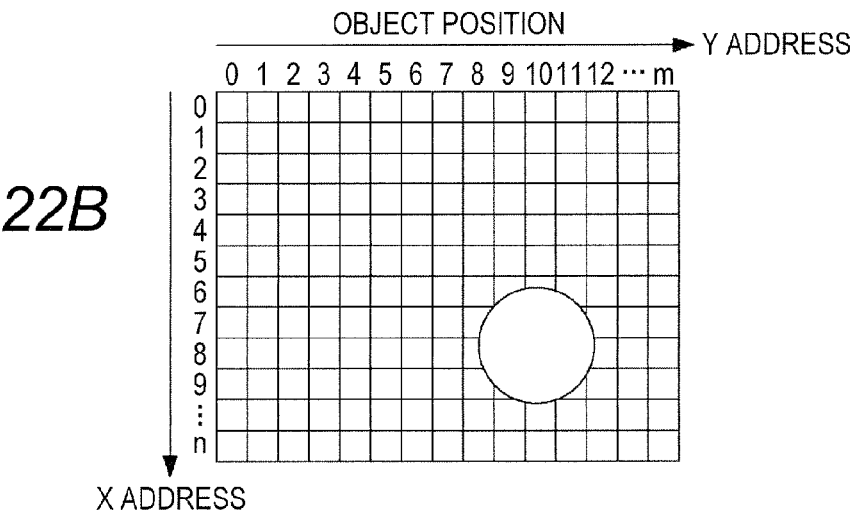
FIG. 22C
PIXEL DEFECT INFORMATION
| X ADDRESS | Y ADDRESS | DETECTION LEVEL |
|---|---|---|
| 1 | 1 | 200 |
| 2 | 10 | 100 |
| 3 | 8 | 400 |
| 5 | 4 | 200 |
| 5 | 6 | 1600 |
| 7 | 9 | 200 |
| 8 | 1 | 100 |
| 9 | 4 | 800 |
| 9 | 11 | 400 |
| ⋮ | ⋮ | ⋮ |

FIG. 23A
IMAGE H
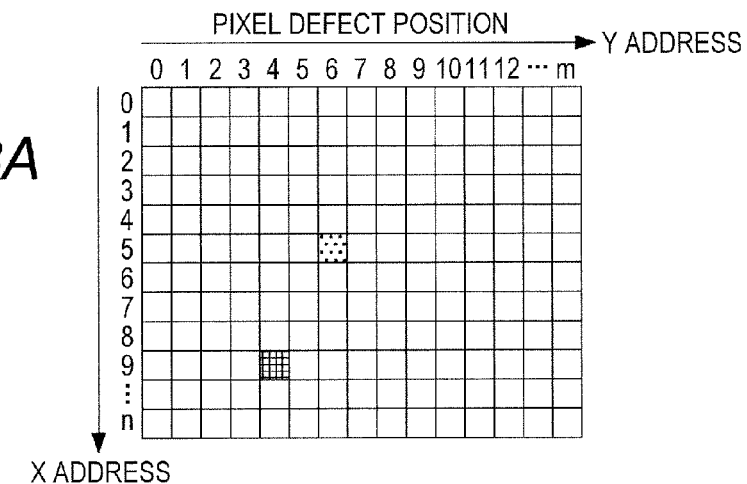
FIG. 23B
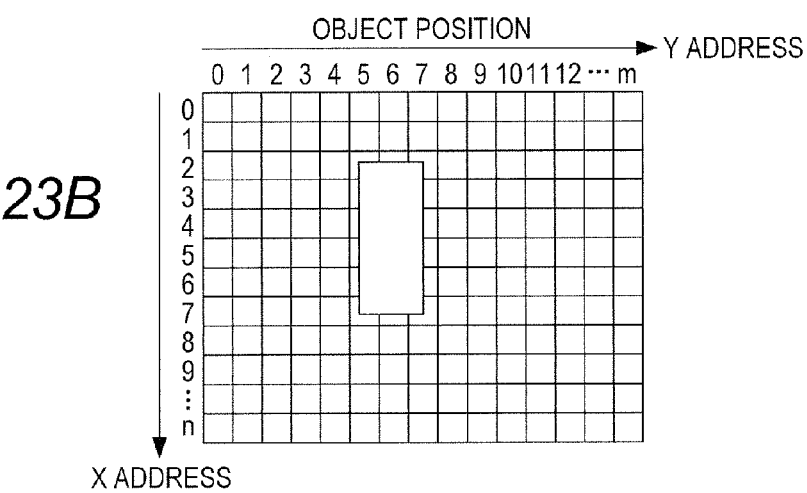
FIG. 23C
PIXEL DEFECT INFORMATION
| X ADDRESS | Y ADDRESS | DETECTION LEVEL |
|---|---|---|
| 1 | 1 | 200 |
| 2 | 10 | 100 |
| 3 | 8 | 400 |
| 5 | 4 | 200 |
| 5 | 6 | 1600 |
| 7 | 9 | 200 |
| 8 | 1 | 100 |
| 9 | 4 | 800 |
| 9 | 11 | 400 |
| ⋮ | ⋮ | ⋮ |

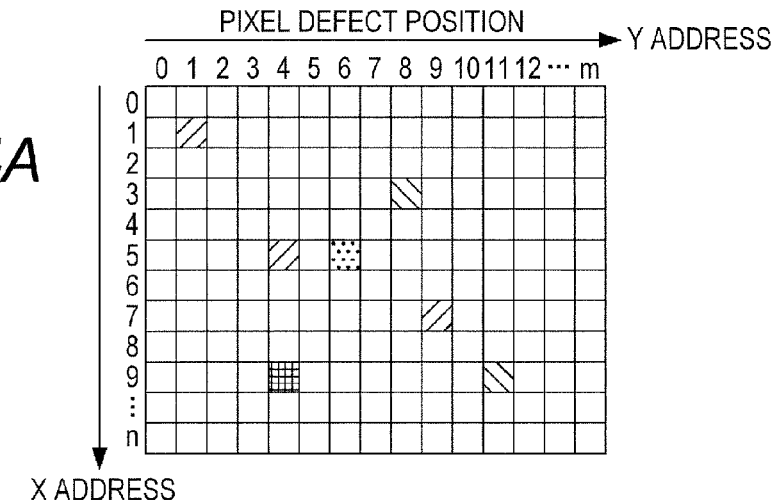
FIG. 24A
IMAGE F
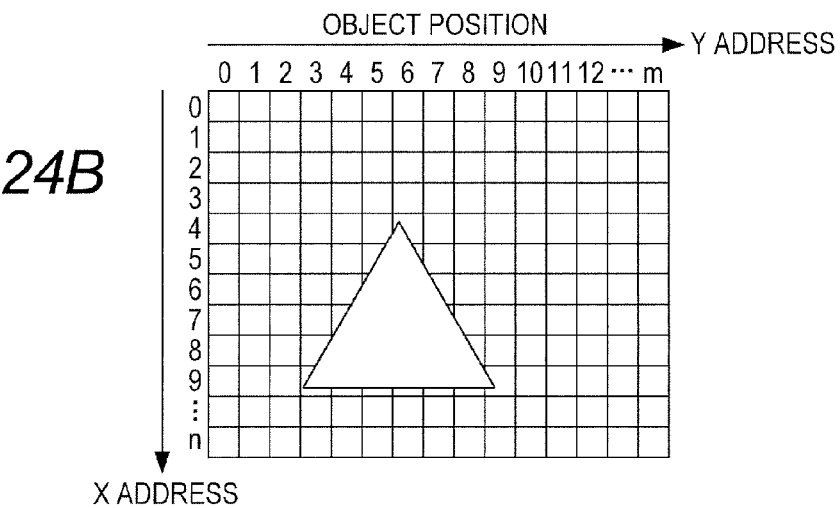
FIG. 24B
FIG. 24C
PIXEL DEFECT INFORMATION
| X ADDRESS | Y ADDRESS | DETECTION LEVEL |
|---|---|---|
| 1 | 1 | 200 |
| 3 | 8 | 400 |
| 5 | 4 | 200 |
| 5 | 6 | 1600 |
| 7 | 9 | 200 |
| 9 | 4 | 800 |
| 9 | 11 | 400 |
| ⋮ | ⋮ | ⋮ |

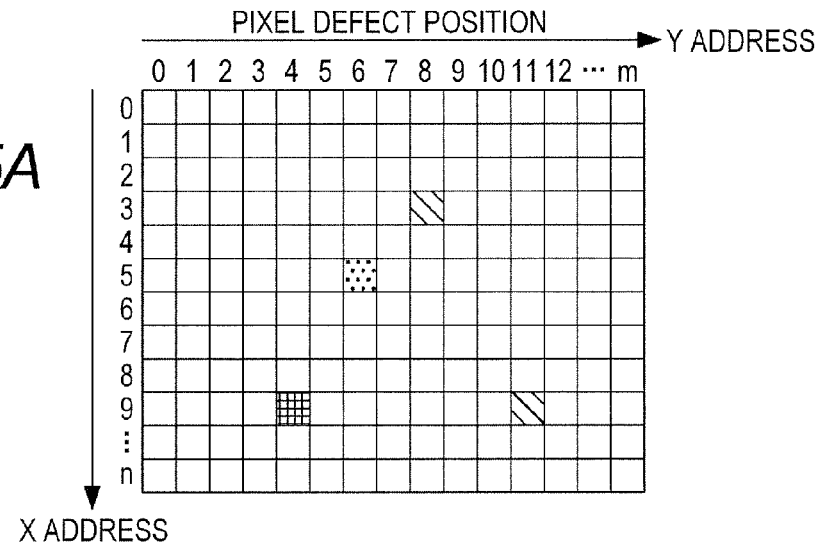
FIG. 25A
IMAGE G
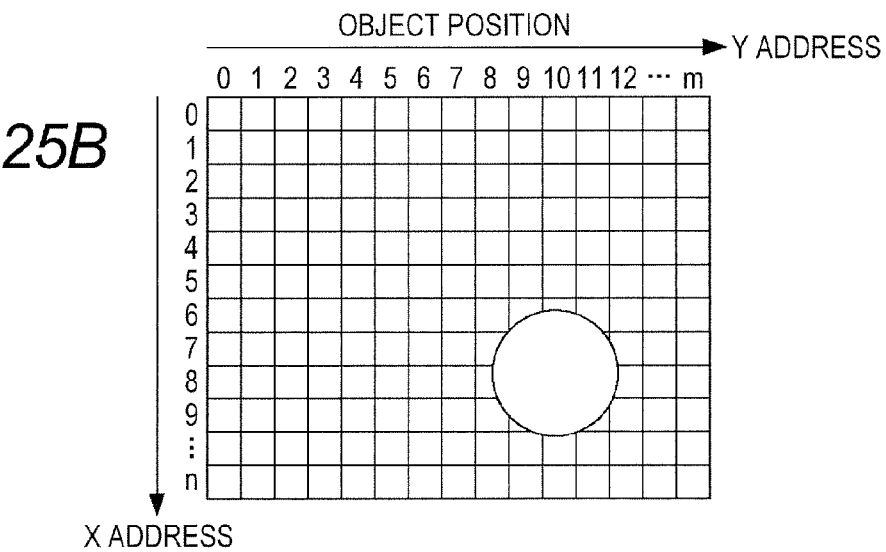
FIG. 25B
PIXEL DEFECT INFORMATION
| X ADDRESS | Y ADDRESS | DETECTION LEVEL |
|---|---|---|
| 3 | 8 | 400 |
| 5 | 6 | 1600 |
| 9 | 4 | 800 |
| 9 | 11 | 400 |
| ⋮ | ⋮ | ⋮ |
FIG. 25C FIG. 26A
IMAGE G
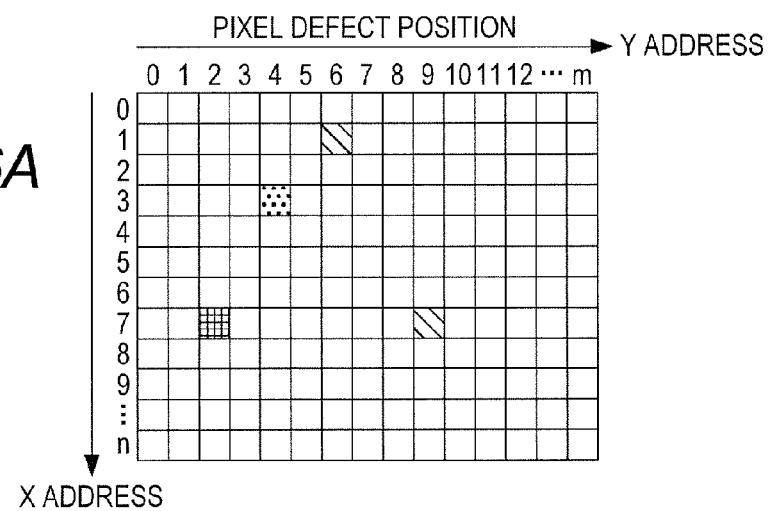
FIG. 26B
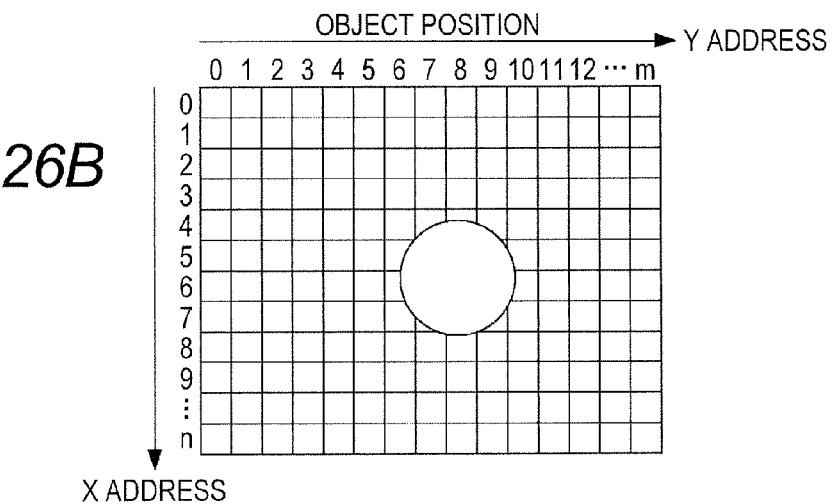
FIG. 26C
PIXEL DEFECT INFORMATION
| X ADDRESS | Y ADDRESS | DETECTION LEVEL |
|---|---|---|
| 1 | 6 | 400 |
| 3 | 4 | 1600 |
| 7 | 2 | 800 |
| 7 | 9 | 400 |
| ⋮ | ⋮ | ⋮ |

IMAGE G

PIXEL DEFECT INFORMATION

| X ADDRESS | Y ADDRESS | DETECTION LEVEL |
|---|---|---|
| 1 | 6 | 200 |
| 3 | 4 | 800 |
| 7 | 2 | 400 |
| 7 | 9 | 200 |
| ⋮ | ⋮ | ⋮ |

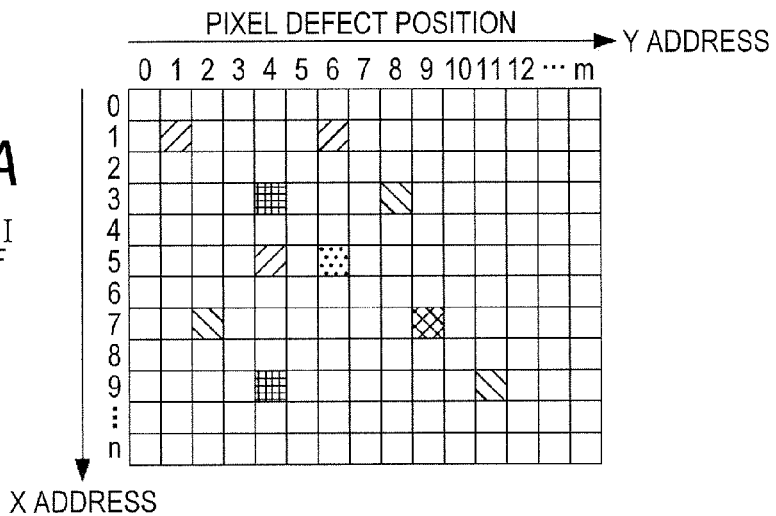
FIG. 28A
COMBINED IMAGE I
(COMBINATION OF
IMAGES F AND G)
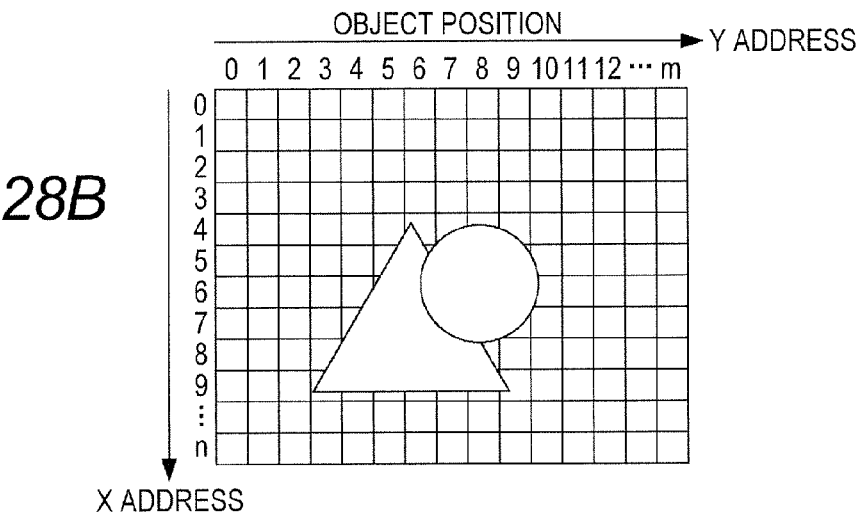
FIG. 28B
FIG. 28C
PIXEL DEFECT INFORMATION
| X ADDRESS | Y ADDRESS | DETECTION LEVEL |
|---|---|---|
| 1 | 1 | 200 |
| 1 | 6 | 200 |
| 3 | 4 | 800 |
| 3 | 8 | 400 |
| 5 | 4 | 200 |
| 5 | 6 | 1600 |
| 7 | 2 | 400 |
| 7 | 9 | 100 |
| 9 | 4 | 800 |
| 9 | 11 | 400 |
| ⋮ | ⋮ | ⋮ |

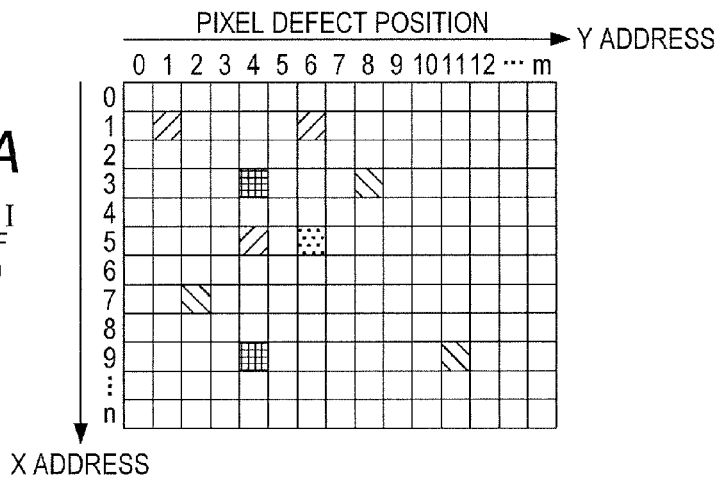
FIG. 29A
COMBINED IMAGE I
(COMBINATION OF
IMAGES F AND G)
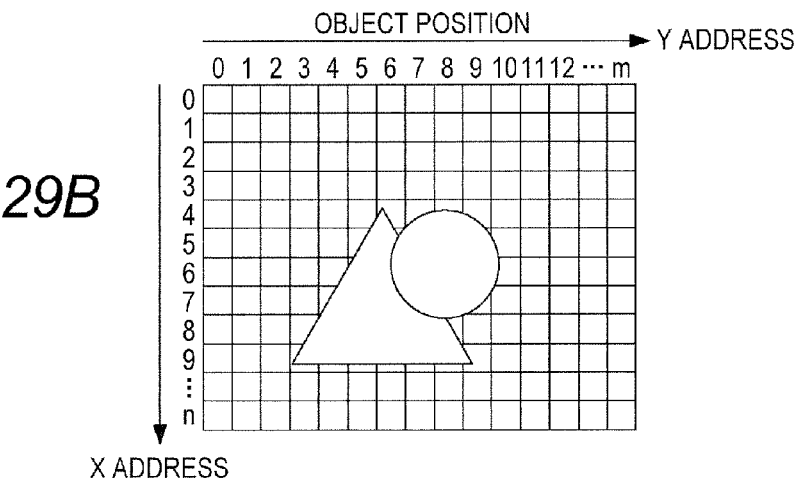
FIG. 29B
FIG. 29C
PIXEL DEFECT INFORMATION
| X ADDRESS | Y ADDRESS | DETECTION LEVEL |
|---|---|---|
| 1 | 1 | 200 |
| 1 | 6 | 200 |
| 3 | 4 | 800 |
| 3 | 8 | 400 |
| 5 | 4 | 200 |
| 5 | 6 | 1600 |
| 7 | 2 | 400 |
| 7 | 9 | 100 |
| 9 | 4 | 800 |
| 9 | 11 | 400 |
| ⋮ | ⋮ | ⋮ |

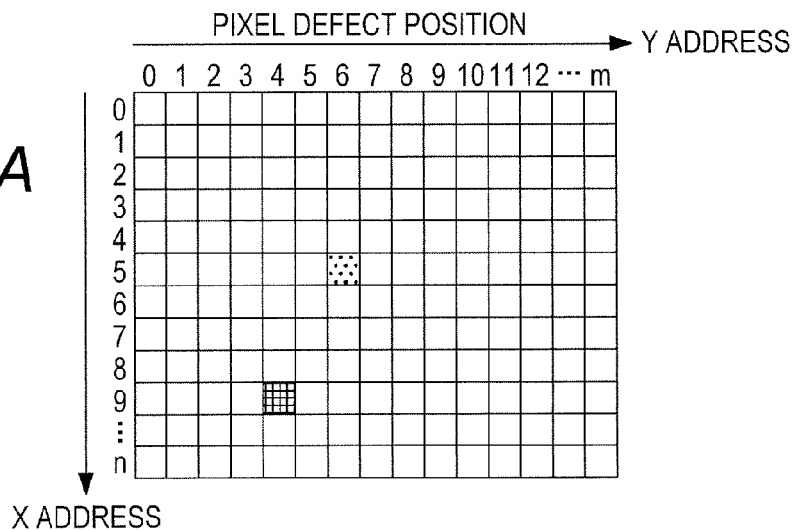
FIG. 30A
IMAGE H
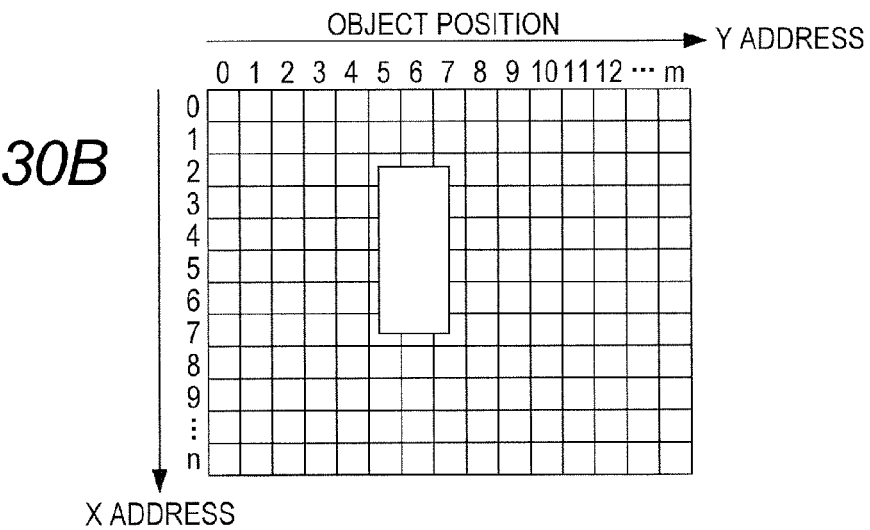
FIG. 30B
FIG. 30C
PIXEL DEFECT INFORMATION
| X ADDRESS | Y ADDRESS | DETECTION LEVEL |
|---|---|---|
| 5 | 6 | 1600 |
| 9 | 4 | 800 |
| ⋮ | ⋮ | ⋮ |

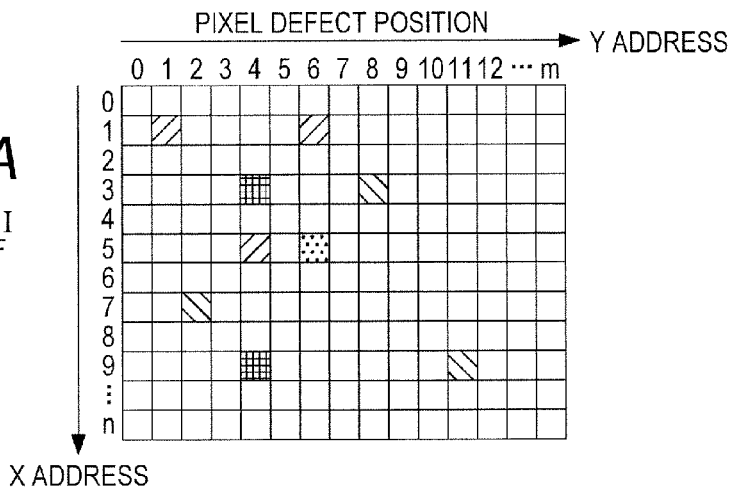
FIG. 31A
COMBINED IMAGE I
(COMBINATION OF
IMAGES F AND G)
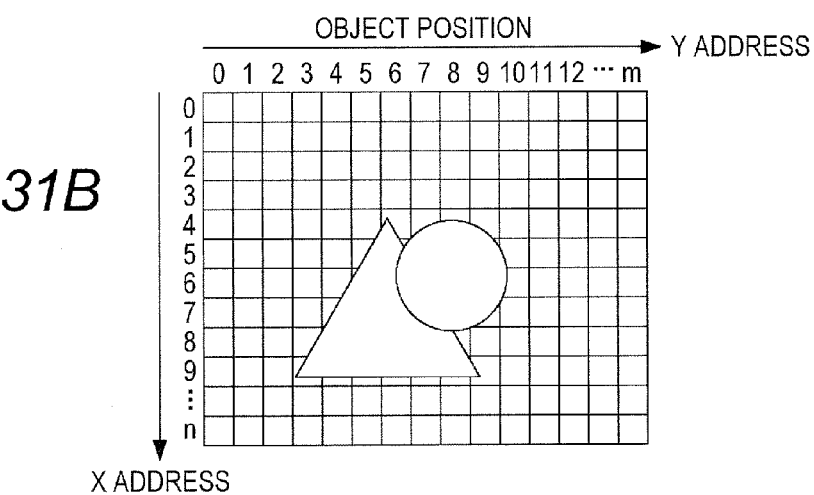
FIG. 31B
PIXEL DEFECT INFORMATION
FIG. 31C
| X ADDRESS | Y ADDRESS | DETECTION LEVEL |
|---|---|---|
| 1 | 1 | 200 |
| 1 | 6 | 200 |
| 3 | 4 | 800 |
| 3 | 8 | 400 |
| 5 | 4 | 200 |
| 5 | 6 | 1600 |
| 7 | 2 | 400 |
| 9 | 4 | 800 |
| 9 | 11 | 400 |
| ⋮ | ⋮ | ⋮ |

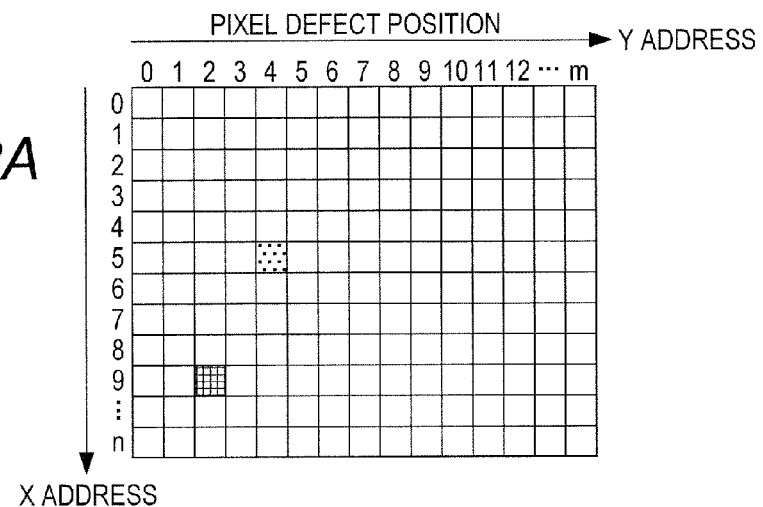
FIG. 32A
IMAGE H
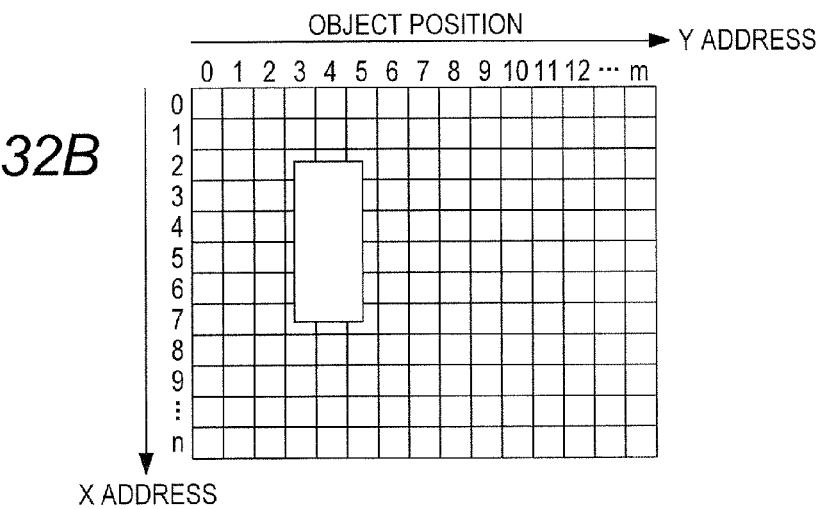
FIG. 32B
FIG. 32C
PIXEL DEFECT INFORMATION
| X ADDRESS | Y ADDRESS | DETECTION LEVEL |
|---|---|---|
| 5 | 4 | 1600 |
| 9 | 2 | 800 |
| ⋮ | ⋮ | ⋮ |

FIG. 33A
IMAGE H
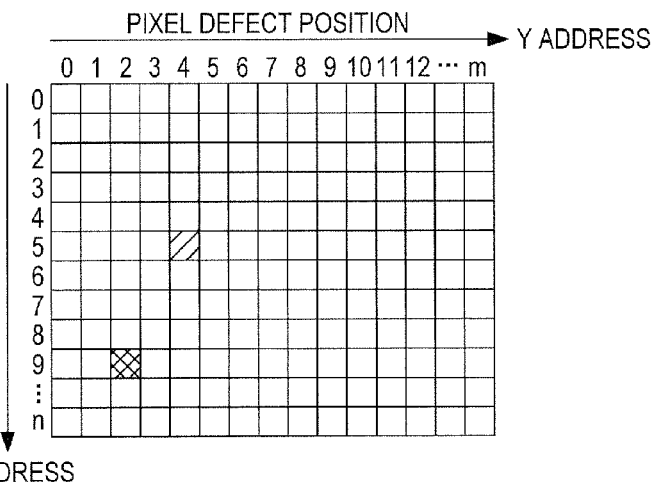
FIG. 33B
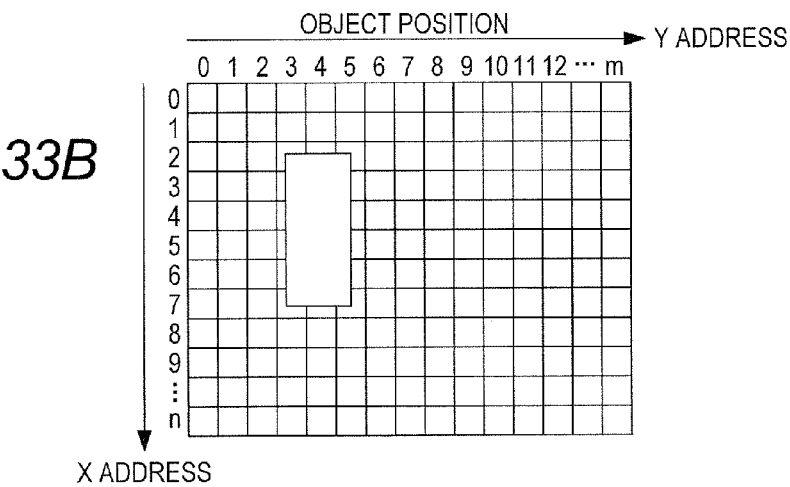
FIG. 33C
PIXEL DEFECT INFORMATION
| X ADDRESS | Y ADDRESS | DETECTION LEVEL |
|---|---|---|
| 5 | 4 | 200 |
| 9 | 2 | 100 |
| ⋮ | ⋮ | ⋮ |

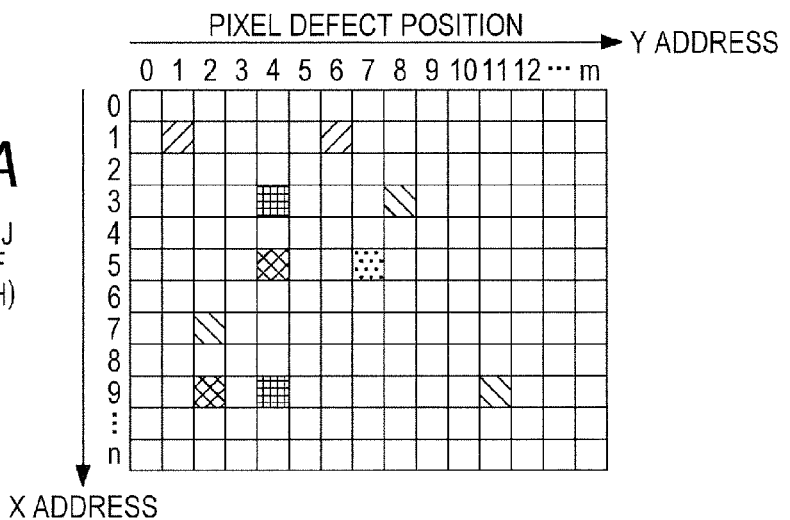
FIG. 34A
COMBINED IMAGE J
(COMBINATION OF
IMAGES F, G AND H)
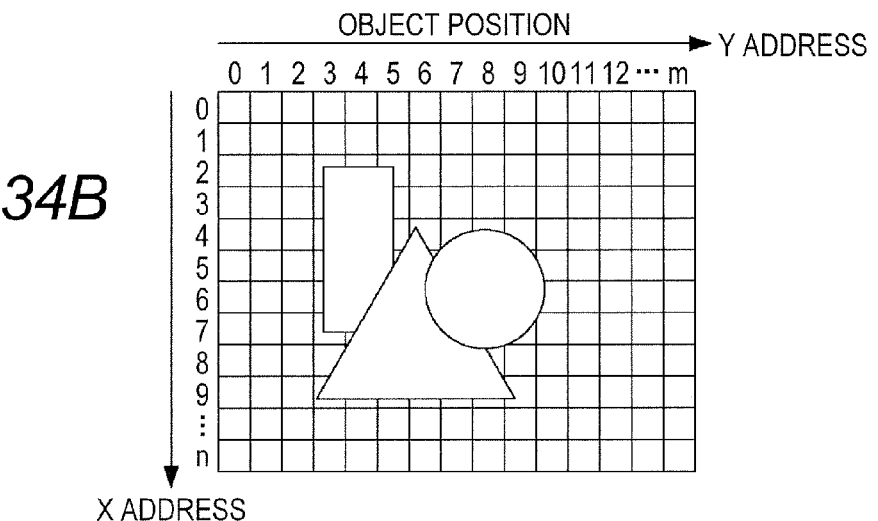
FIG. 34B
FIG. 34C
PIXEL DEFECT INFORMATION
| X ADDRESS | Y ADDRESS | DETECTION LEVEL |
|---|---|---|
| 1 | 1 | 200 |
| 1 | 6 | 200 |
| 3 | 4 | 800 |
| 3 | 8 | 400 |
| 5 | 4 | 100 |
| 5 | 7 | 1600 |
| 7 | 2 | 400 |
| 9 | 2 | 200 |
| 9 | 4 | 800 |
| 9 | 11 | 400 |
| ⋮ | ⋮ | ⋮ |

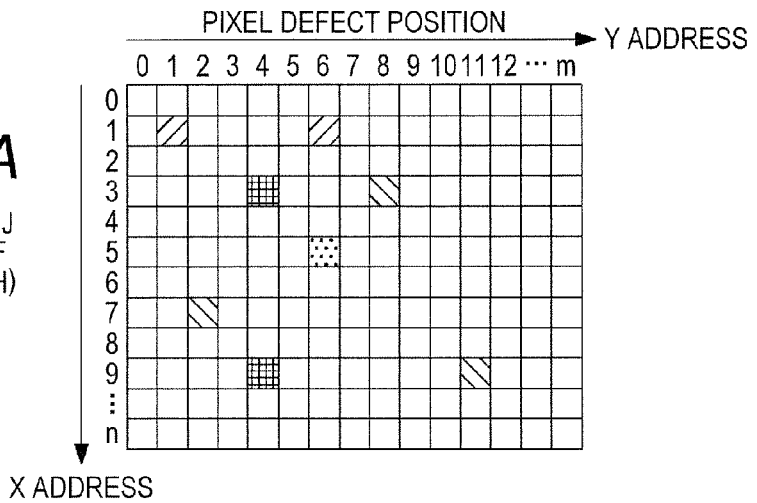
FIG. 35A
COMBINED IMAGE J
(COMBINATION OF
IMAGES F, G AND H)
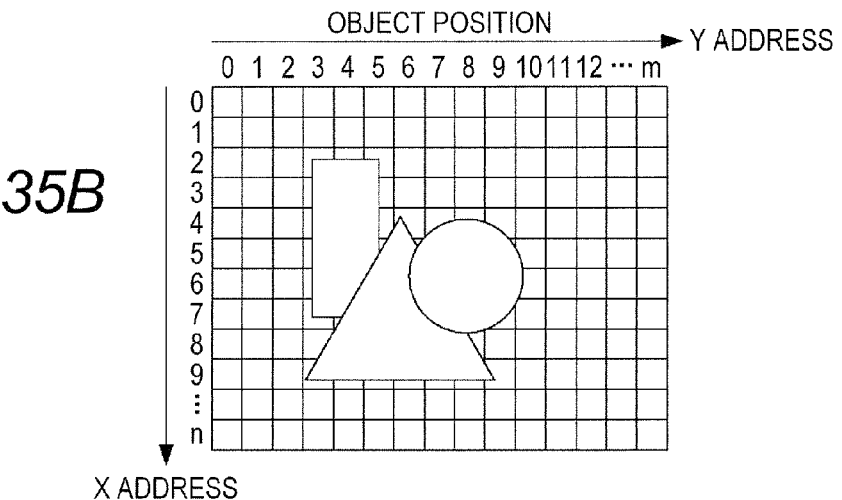
FIG. 35B
FIG. 35C
PIXEL DEFECT INFORMATION
| X ADDRESS | Y ADDRESS | DETECTION LEVEL |
|---|---|---|
| 1 | 1 | 200 |
| 1 | 6 | 200 |
| 3 | 4 | 800 |
| 3 | 8 | 400 |
| 5 | 4 | 100 |
| 5 | 6 | 1600 |
| 7 | 2 | 400 |
| 9 | 2 | 200 |
| 9 | 4 | 800 |
| 9 | 11 | 400 |
| ⋮ | ⋮ | ⋮ |

IMAGE PICKUP APPARATUS, IMAGE COMBINATION METHOD, AND COMPUTER PROGRAM

BACKGROUND OF THE INVENTION

1. Field of the Invention

The present invention relates to an image pickup apparatus, an image combination method, and a computer program and, more particularly, is suitable for use for correctings a defect of a pixel of an image pickup element.

2. Description of the Related Art

In an image pickup apparatus in the related art, a pixel defect of an image pickup element is corrected as follows. First, pixel defect information such as position information and the like of a defective pixel in the image pickup element is inspected just before a shipping of a product, and the pixel defect information is stored every product of the image pickup apparatus. By a dedicated correction circuit equipped for the image pickup apparatus, a processing for suppressing that a damage which causes a pixel defect stands out is executed to an image which is formed by the image pickup apparatus.

For example, Japanese Patent Application Laid-Open No. 2004-242103 discloses a method whereby position information of a defective pixel is stored every operation mode such as still image shooting mode, live view mode (monitor mode), or the like and the pixel defect is corrected in each operation mode by using the position information of each defective pixel.

In the image pickup apparatus, such a vibration correction or multiple exposure that after a plurality of images are image picked up and a position adjustment is performed, obtained images are combined is executed. In the case of combining the images as mentioned above, there is such a problem that when the images are superimposed, such fine pixel defects that no problem will occur in a single image is accumulated and the pixel defects become conspicuous as a damage.

However, according to the related art disclosed in the above patent literature, in the case of combining a plurality of images by shifting (matching) the positions thereof, a damage which became conspicuous due to coincidence of the positions of the fine pixel cannot be corrected.

SUMMARY OF THE INVENTION

It is an aspect of the invention to surely correct a damage which is caused by accumulation of fine pixel defects included in each image when a plurality of photographed images are combined by shifting positions thereof.

According to an aspect of the present invention, an image pickup apparatus comprises: a combination unit configured to combine a plurality of images photographed by using an image pickup element; a change unit configured to, in the case where pixel positions of defective pixels in each of the plurality of images which are to be combined by the combination unit coincide, change defect level information showing a level of the defect of the defective pixel in a combined image; and a correction unit configured to, on the basis of the defect level information before it is changed by the change unit, correct the defective pixels in each of the plurality of images which are to be combined by the combination unit and, on the basis of the defect level information changed by the change unit, correct the defective pixels in the image combined by the combination unit.

According to the invention, the damage which is caused by accumulation of the fine pixel defects included in each image when a plurality of photographed images are combined by shifting positions thereof can be surely corrected.

Further features of the present invention will become apparent from the following description of exemplary embodiments with reference to the attached drawings.

BRIEF DESCRIPTION OF THE DRAWINGS

FIGS. 6A, 6B and 6C are diagrams illustrating damage positions of an image A after correction, an object position, and damage information.

FIGS. 7A, 7B and 7C are diagrams illustrating pixel defect positions of an image B after correction, an object position, and pixel defect information.

FIGS. 8A, 8B and 8C are diagrams illustrating pixel defect positions of an image C after correction, an object position, and pixel defect information.

FIGS. 9A, 9B and 9C are diagrams illustrating pixel defect positions of the image B after address conversion, an object position, and pixel defect information.

FIG. 10 is a diagram illustrating pixel defect information in which pixel defect information of the image A and pixel defect information of the image B are synthesized.

FIGS. 11A, 11B and 11C are diagrams illustrating pixel defect positions of a combined image D, an object position, and pixel defect information.

FIGS. 12A, 12B and 12C are diagrams illustrating pixel defect positions of the combined image D after correction, an object position, and pixel defect information.

FIGS. 13A, 13B and 13C are diagrams illustrating pixel defect positions of the image C after address conversion, an object position, and pixel defect information.

FIG. 14 is a diagram illustrating a damaged image in which pixel defect information of the combined image D and pixel defect information of the image C are synthesized.

FIGS. 15A, 15B and 15C are diagrams illustrating pixel defect positions of a combined image E, an object position, and pixel defect information.

FIGS. 16A, 16B and 16C are diagrams illustrating pixel defect positions of the combined image E after correction, an object position, and pixel defect information.

FIGS. 21A, 21B and 21C are diagrams illustrating pixel defect positions of an image F after correction, an object position, and pixel defect information.

FIGS. 22A, 22B and 22C are diagrams illustrating pixel defect positions of an image G after correction, an object position, and pixel defect information.

FIGS. 23A, 23B and 23C are diagrams illustrating pixel defect positions of an image H after correction, an object position, and pixel defect information.

FIGS. 24A, 24B and 24C are diagrams illustrating pixel defect information of the image F in which the information of the pixels corrected at the time of photographing and the information of the pixels existing out of a range of the image pickup element are deleted.

FIGS. 25A, 25B and 25C are diagrams illustrating pixel defect information of the image G in which the information of the pixels corrected at the time of photographing and the information of the pixels existing out of a range of the image pickup element are deleted.

FIGS. 26A, 26B and 26C are diagrams illustrating pixel defect positions of the image G after address conversion, an object position, and pixel defect information.

FIGS. 28A, 28B and 28C are diagrams illustrating pixel defect positions of a combined image I, an object position, and pixel defect information.

FIGS. 29A, 29B and 29C are diagrams illustrating pixel defect positions of the combined image I after correction, an object position, and pixel defect information.

FIGS. 30A, 30B and 30C are diagrams illustrating positions of defective pixels of an image H in which the information of the pixels corrected at the time of photographing and the information of the pixels existing out of the range of the image pickup element are deleted, an object position, and pixel defect information.

FIGS. 31A, 31B and 31C are diagrams illustrating positions of defective pixels of the combined image I in which the information of the pixels corrected upon combination is deleted, an object position, and pixel defect information.

FIGS. 32A, 32B and 32C are diagrams illustrating pixel defect positions of the image H after address conversion, an object position, and pixel defect information.

FIGS. 33A, 33B and 33C are diagrams illustrating an example of positions of defective pixels of the image H after a detection level is converted, an object position, and pixel defect information.

FIGS. 34A, 34B and 34C are diagrams illustrating pixel defect positions of a combined image J, an object position, and pixel defect information.

FIGS. 35A, 35B and 35C are diagrams illustrating positions of defective pixels of the combined image J after the defective pixels are corrected, an object position, and pixel defect information.

DESCRIPTION OF THE EMBODIMENTS

Exemplar embodiments of the present invention will be described in detail hereinbelow with reference to the drawings.

First Embodiment

Figure 1:
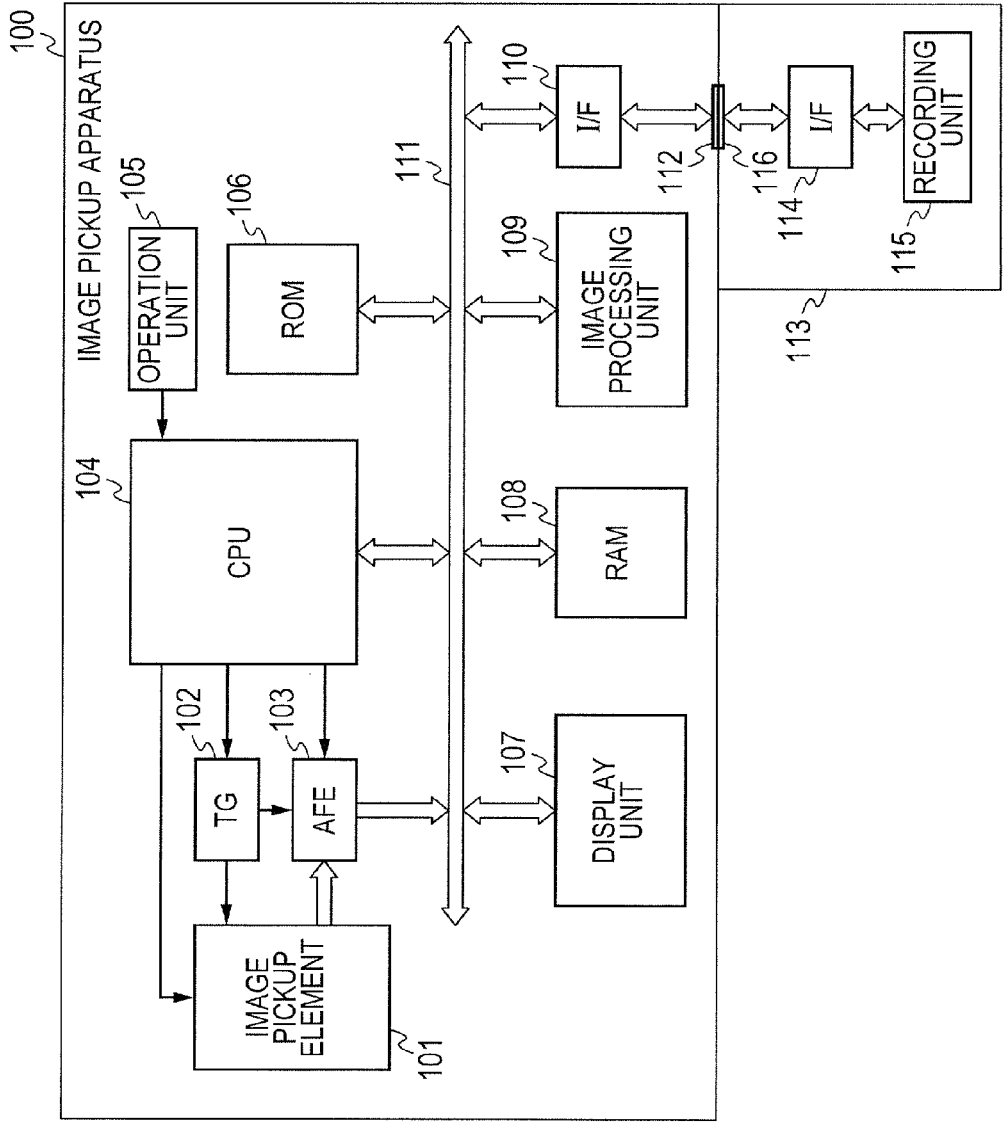
FIG. 1 is a diagram illustrating a construction of an image pickup apparatus.

First, the first embodiment of the invention will be described. FIG. 1 is a diagram illustrating an example of a construction of an image pickup apparatus according to the embodiment. An example of a fundamental construction of the image pickup apparatus of the embodiment will be described hereinbelow with reference to FIG. 1.

In an image pickup apparatus 100 illustrated in FIG. 1, an image pickup element 101 converts (photoelectrically converts) an optical image into an electric signal. An analog front end (AFE) 103 executes a gain adjustment and a digital conversion corresponding to a predetermined quantization bit to an analog image signal which is output from the image pickup element 101. A TG 102 is a timing generator for controlling drive timing of the image pickup element 101 and the AFE 103.

A RAM 108 also has: a function serving as an image data storage unit for storing digital image data converted by the AFE 103 and image data processed by an image processing unit 109, which will be described hereinafter; a function serving as a work memory which is used when a CPU 104, which will be described hereinafter, operates; and the like. Although those functions are executed by using the RAM 108 in the embodiment, those functions can be also realized by using a memory other than the RAM 108 so long as it is a memory whose access rate is at such a level that no problem will occur.

A program and the like which are used when the CPU 104, which will be described hereinafter, operates are stored in a ROM 106. Although a case where the ROM 106 is a Flash-ROM will be mentioned and described as an example in the embodiment, a memory other than the Flash-ROM can be also applied as a ROM 106 so long as it is a memory whose access rate is at such a level that no problem will occur.

The CPU 104 integratedly control the image pickup apparatus 100. The image processing unit 109 executes processings such as correction, compression, and the like of a photographed image.

An interface (I/F) 110 is provided to record still image data and moving image data into an external recording medium 113 connected through a connector 112 or to input data from the external recording medium 113. For example, the external recording medium 113 is a non-volatile memory, a hard disk, or the like. The external recording medium 113 has: a connector 116 for connecting the recording medium 113 to the image pickup apparatus 100; and an I/F 114 for inputting and outputting the still image data and the moving image data to/from the image pickup apparatus 100.

Although the detachable external recording medium 113 is applied as a recording medium in the embodiment, another device such as non-volatile memory, hard disk, or the like in which data can be written may be included in the image pickup apparatus 100 as a built-in device.

An operation unit 105 is provided to set a photographing command, a photographing condition, and the like into the CPU 104 on the basis of the operation of the user. A display unit 107 displays a photographed still image or moving image, a menu, or the like.

Figure 2:
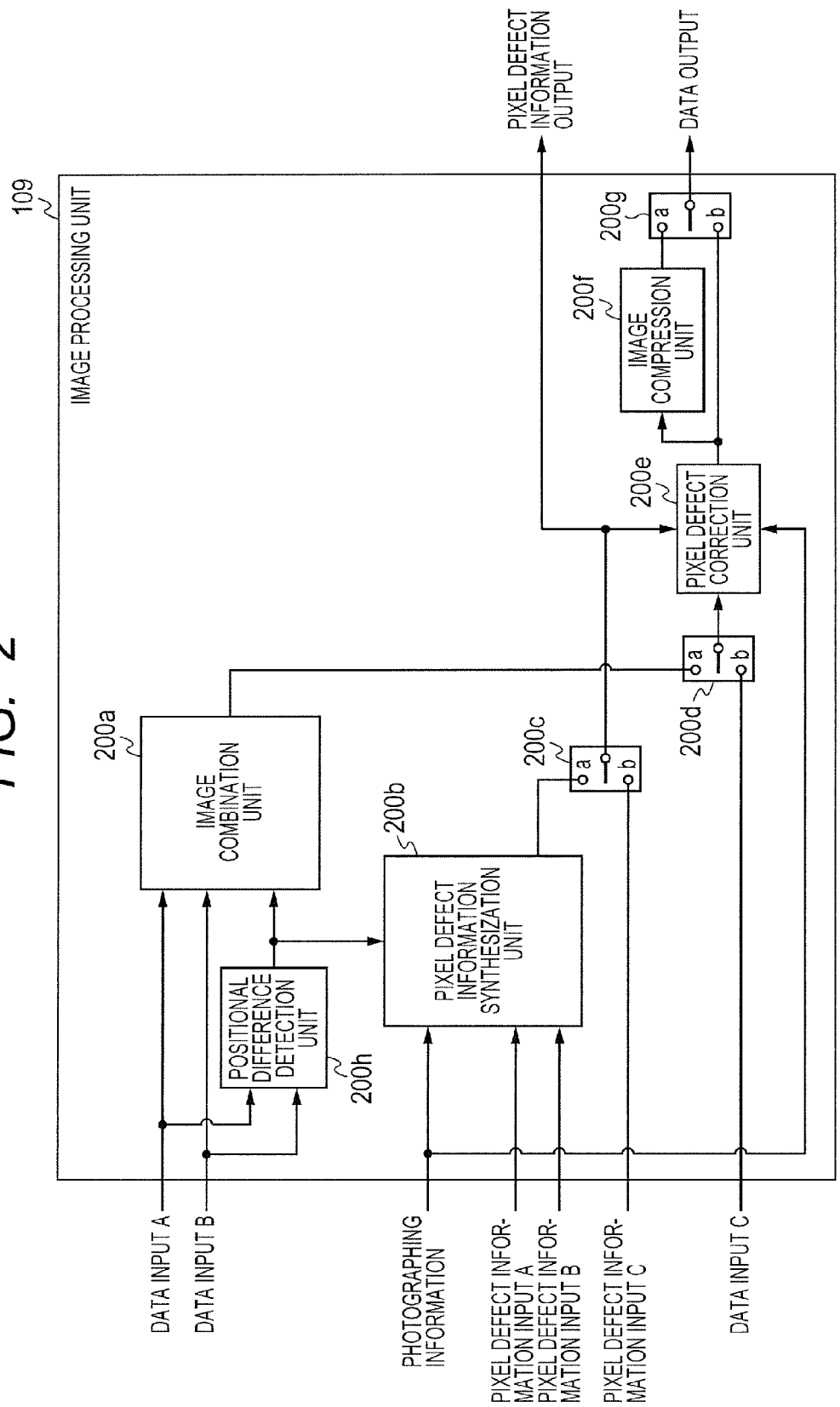
FIG. 2 is a diagram illustrating a construction of an image processing unit of the first embodiment.

FIG. 2 is a diagram illustrating an example of a construction of the image processing unit 109.

An image combination unit 200a combines a plurality of photographed images. A positional difference detection unit 200h detects a positional difference among object positions of the plurality of images from a plurality of photographed image data and outputs a positional difference amount of the object positions to the image combination unit 200a and a pixel defect information synthesization unit 200b, which will be described hereinafter. On the basis of "positional difference amount of the object positions" which is obtained from the positional difference detection unit 200h, the image combination unit 200a executes a predetermined position adjustment processing to the plurality of image data and combines the plurality of images. Although the combination of the images is realized by executing an addition processing of the mutually corresponding pixel data in the embodiment, the image combination method is not limited to such a method.

In the embodiment, the pixel defects of the image are corrected on the basis of pixel defect information stored in the ROM 106. The damage information is information including, for example, a level of the pixel defect and "position (addresses) on the image pickup element 101" of a defective pixel. A pixel defect correction unit 200e inputs the image data to be subjected to a correction of the pixel defect and the pixel defect information and detects and corrects the pixel defect by processings, which will be described hereinafter.

When a plurality of image data are combined, the pixel defect information synthesization unit 200b forms pixel defect information of the image after the combination on the basis of photographing information and the pixel defect information of the image data to be subjected to the combination and outputs to the pixel defect correction unit 200e.

An image compression unit 200f compresses the image when the image is recorded. Each of selectors 200c, 200d, and 200g selects and outputs the image data or the pixel defect information.

Figure 3:
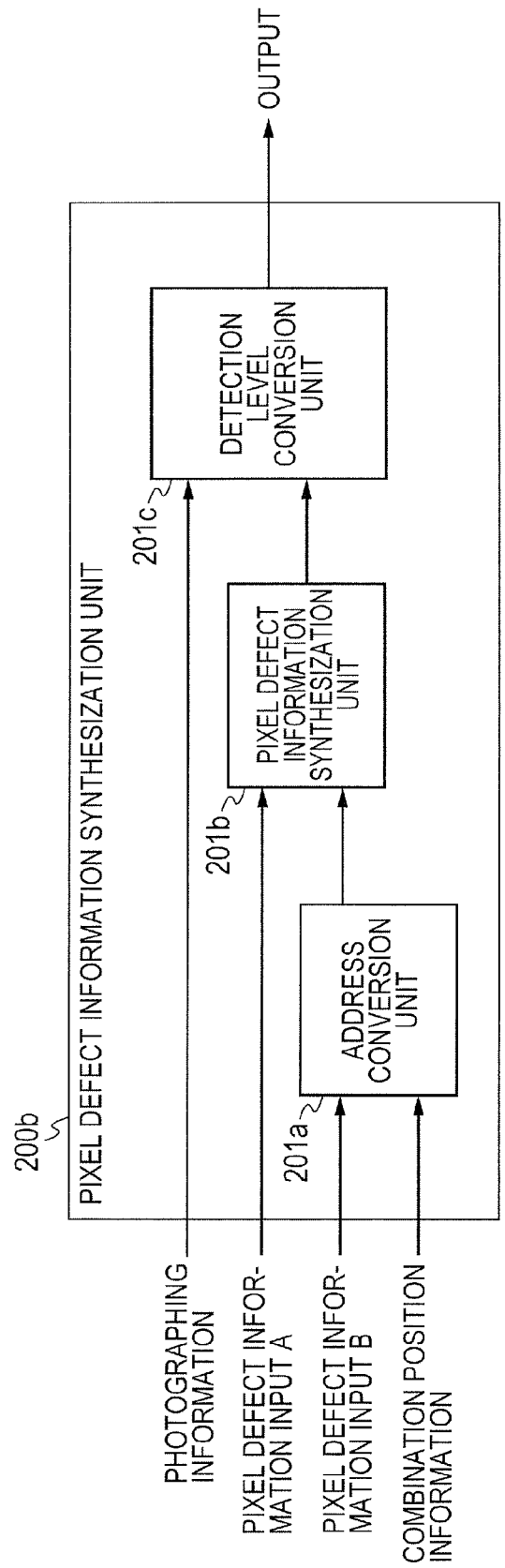
FIG. 3 is a diagram illustrating a construction of a pixel defect information synthesization unit of the first embodiment.

FIG. 3 is a diagram illustrating an example of a construction of the pixel defect information synthesization unit 200b illustrated in FIG. 2.

An address conversion unit 201a converts addresses of the pixel defect information. A pixel defect information synthesization unit 201b synthesizes a plurality of pixel defect information. A detection level conversion unit 201c changes a detection level in the synthesized pixel defect information on the basis of coincidence and dissidence of the addresses at the time of synthesization and on the basis of photographing information.

Figure 4:
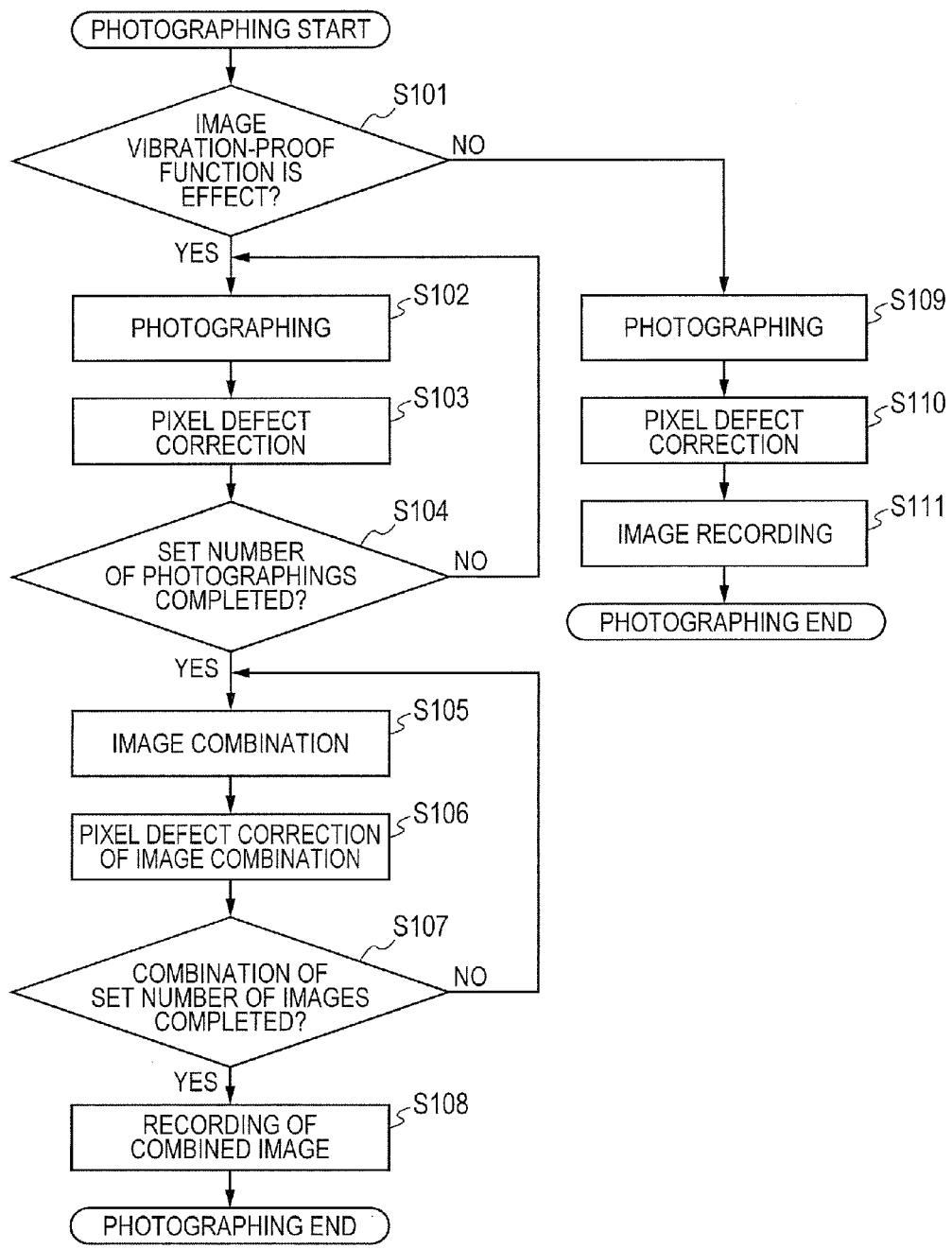
FIG. 4 is a flowchart for describing the operation of the image pickup apparatus of the first embodiment.

Subsequently, an example of the operation of the image pickup apparatus 100 of the embodiment will be described with reference to a flowchart of FIG. 4.

The user sets "valid" or "invalid" of an image vibration-proof function at the time of photographing by using the operation unit 105 from a menu setting which is previously displayed on the display unit 107. After that, when a shutter button of the operation unit 105 is depressed by the user, the photographing is started.

When the photographing is started, in step S101, the CPU 104 discriminates whether or not the image vibration-proof function is valid. If the image vibration-proof function is valid as a result of the discrimination, step S102 follows.

In step S102, when the CPU 104 makes a predetermined setting into the image pickup element 101, TG 102, and AFE 103, the photographing of the image is started. An image signal which is output from the image pickup element 101 is A/D converted (converted into digital data) by the AFE 103. The image signal (image data) which is converted into the digital data is stored in the RAM 108. In the embodiment, it is assumed that photographing sensitivity is equal to ISO100.

After that, in step S103, a correction of a pixel defect is performed. The CPU 104 transfers the image data stored in the RAM 108 to the image processing unit 109. The image data transferred to the image processing unit 109 is input to the image processing unit 109 as a data input C illustrated in FIG. 2. At this time, the selector 200d is connected to a b side and the image data which is input as a data input C is input to the pixel defect correction unit 200e.

The CPU 104 transfers "pixel defect information of the image pickup element 101" stored in the ROM 106 to the image processing unit 109. The pixel defect information transferred in this manner is input to the image processing unit 109 as a pixel defect information input C illustrated in FIG. 2. At this time, the selector 200c is connected to a b side and the pixel defect information which is input as a pixel defect information input C is input to the pixel defect correction unit 200e.

Figures 5A, 5B, 5C:
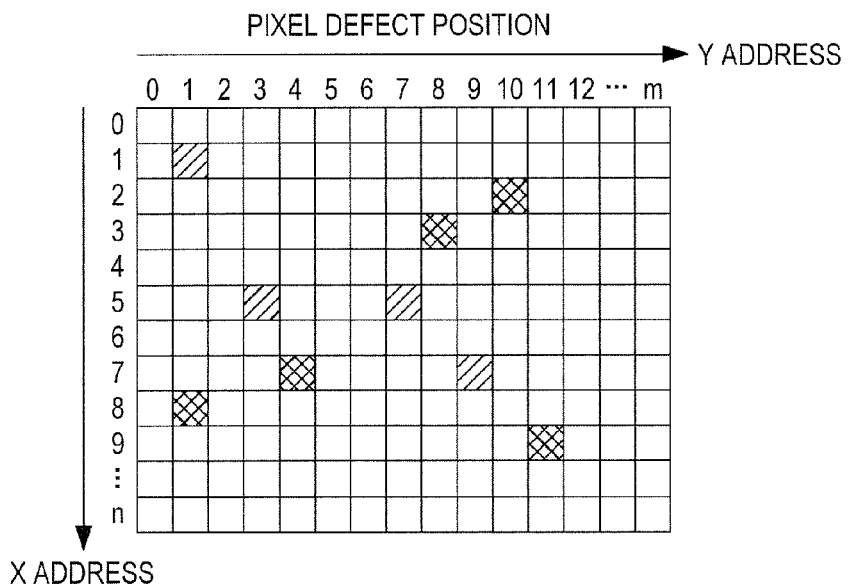
FIGS. 5A, 5B and 5C are diagrams illustrating pixel defect positions, pixel defect information, defective pixels, and pixels surrounding them.

FIG. 5A illustrates pixel positions (pixel defect positions) on the image pickup element 101 and one lattice corresponds to one pixel. It is assumed that the pixel position is defined by an X address and a Y address and pixels are arranged every n pixels in the X address direction and every m pixels in the Y address direction, respectively. In FIG. 5A, a pixel in which a pattern is drawn is a defective pixel. FIG. 5B is a diagram illustrating pixel defect information corresponding to the defective pixel illustrated in FIG. 5A. A pixel defect position shown by the X·Y addresses and a detection level of the pixel defect showing a degree (size) of the pixel defect of each defective pixel are included in the pixel defect information. The larger a value of the detection level is, the smaller an output value (pixel value) as a defective pixel is. In FIG. 5A, the defective pixel is shown by making the pattern different in accordance with the detection level.

The pixel defect correction unit 200e sequentially monitors (designates) the pixel positions of the image data which is sequentially input to the pixel defect correction unit 200e. When the position (X·Y addresses) of the defective pixel existing in the pixel defect information is designated, the detection level of the relevant pixel is referred to from the pixel defect information. The pixel defect correction unit 200e refers to the photographing sensitivity from the photographing information which is input simultaneously with the image data and discriminates the presence or absence of the correction of the relevant pixel (detects the pixel defect) in accordance with the photographing sensitivity and the detection level. For example, when the photographing sensitivity is equal to ISO100, the pixel defect correction unit 200e corrects the defective pixel whose detection level is equal to 100. When the photographing sensitivity is equal to ISO200, the pixel defect correction unit 200e corrects the defective pixel whose detection level is equal to or less than 200.

The correction of the defective pixel is performed by, for example, a method whereby an average value of outputs (pixel values) of the pixels surrounding the relevant pixel, that is, the pixels of the same color as that of the relevant pixel is replaced as a pixel value of the relevant pixel. FIG. 5C is a diagram illustrating an example of the defective pixel and the pixels surrounding it. For example, in the case of correcting "pixel locating at G22" illustrated in FIG. 5C, a value obtained by averaging outputs (pixel values) of the pixels locating at G11, G13, G31, and G33 is replaced as a pixel value at G22. Although the embodiment is described with respect to the case of correcting the defective pixel as mentioned above as an example, the method of correcting the defective pixel is not limited.

Since the photographing is executed at the photographing sensitivity of ISO100 in the embodiment, "pixels whose addresses (X, Y) are equal to (2, 10), (3, 8), (7, 4), (8, 1), and (9, 11)" whose detection levels are equal to 100 are corrected. FIGS. 6A to 6C are diagrams illustrating an example of positions (FIG. 6A) of defective pixels of the first image after defective pixels are corrected, an object position (FIG. 6B), and pixel defect information (FIG. 6C). In FIG. 6A, although the defect pixels which are not corrected since the detection level is equal to 200 remain, since an output value of each of those defective pixels is small as a defective pixel, they do not exert an influence on image quality.

The corrected image is stored as a first image into the RAM 108. A relation between the pixel position of the image pickup element of the first image and the object position is as illustrated in FIG. 6B. Such an image is referred to as an image A in the following description.

Subsequently, in step S104, the CPU 104 discriminates whether or not the photographing of the necessary number of photographings (the set number of photographings) at the time of the image vibration-proof operation is completed. Since three images are used at the time of the image vibration-proof operation in the embodiment, the processing routine is returned to step S102 and the next photographing is executed. After that, the operations of steps S102 to S104 mentioned above are repeated and the second and third images are stored into the RAM 108.

FIGS. 7A to 7C and FIGS. 8A to 8C are diagrams illustrating examples of positions (FIG. 7A, FIG. 8A) of defective pixels of the second and third images after the defective pixels are corrected, object positions (FIG. 7B, FIG. 8B), and pixel image information (FIG. 7C, FIG. 8C). Relations among "the defective pixels of the images after the pixel defects are corrected, the pixel positions of the image pickup element, and the object positions" of the second and third images are as illustrated in FIGS. 7A to 7C and FIGS. 8A to 8C, respectively. Those images are referred to as an image B and an image C in the following description, respectively.

If the photographing of the set number and the correction of the defective pixels are completed in step S104, the processing routine advances to step S105 and the three images A, B, and C are combined. First, the CPU 104 transfers the data of the images A and B stored in the RAM 108 to the image processing unit 109. As a data input A illustrated in FIG. 2, the data of the image A is input to the image processing unit 109 and, as a data input B, the data of the image B is input thereto. Thus, the data of the images A and B is input to the positional difference detection unit 200h. The positional difference detection unit 200h detects a positional difference between the images A and B. As illustrated in FIGS. 6A to 6C and FIGS. 7A to 7C, if the addresses of each pixel of the image B are shifted in the X address direction by +4 and in the Y address direction by +2, the object position coincides with the position of the image A. Therefore, the positional difference detection unit 200h outputs combination position information (+4, +2). Although the positions of the images B and C are matched with the position of the image A in the embodiment, it is not always necessary to perform such an operation if the positions of the images A, B, and C are matched with a reference position.

The image combination unit 200a shifts the addresses of each pixel of the image B in the X address direction by +4 and in the Y address direction by +2 on the basis of the combination position information (+4, +2) which is output from the positional difference detection unit 200h, adds the image B after it is shifted and the image A, and outputs a combined image D. After that, in step S106, defective pixels of the combined image D are corrected.

First, the CPU 104 transfers pixel defect information of the images A and B to the image processing unit 109. The pixel defect information is input to the image processing unit 109 as pixel defect information inputs A and B illustrated in FIG. 2, respectively. The pixel defect information of the images A and B in this instance is as illustrated in FIGS. 6C and 7C, respectively, and is identical to the pixel defect information illustrated in FIG. 5B. Photographing information of the photographing sensitivity (ISO100) at the time of photographing the images A and B and the combination position information which is output from the positional difference detection unit 200h are input to the pixel defect information synthesization unit 200b. The pixel defect information of the image B which is input as a pixel defect information input B and the combination position information are input to the address conversion unit 201a. On the basis of the combination position information, the address conversion unit 201a converts the addresses included in the pixel defect information of the image B. FIGS. 9A to 9C are diagrams illustrating an example of positions (FIG. 9A) of defective pixels of the second image (image B) after the addresses are converted, an object position (FIG. 9B), and pixel defect information (FIG. 9C). Since the combination position information at this time is equal to (+4, +2), the addresses included in the pixel defect information of the image B are shifted in the X address direction by +4 and in the Y address direction by +2. Thus, the pixel defect information illustrated in FIG. 7C is converted into the pixel defect information illustrated in FIG. 9C.

After that, the pixel defect information of the image A which is input as a pixel defect input A and the pixel defect information (after the conversion) of the image B which is output from the address conversion unit 201a are synthesized. FIG. 10 is a diagram illustrating pixel defect information in which the pixel defect information of the image A and the pixel defect information of the image B after the addresses are converted in accordance with the image A are synthesized. The data of the synthesized pixel defect information is input to the detection level conversion unit 201c. The photographing information (photographing sensitivity of ISO100) is also input to the detection level conversion unit 201c. Since the defect whose detection level is equal to 100 is already corrected, it is deleted from the pixel defect information illustrated in FIG. 10. The pixel in which the same (two) addresses are shown as pixel defect information is a pixel in which the defects double after the images are combined and it is shown that an output value as a defect is large. Therefore, with respect to such a pixel, the detection level of the pixel defect information is changed higher by one degree. In the example illustrated in FIG. 10, since the defects whose detection levels are equal to 200 double in the pixel of the addresses (5, 3), the detection level is changed to 100 which is higher by one degree.

FIGS. 11A to 11C are diagrams illustrating pixel defect positions (FIG. 11A) of a combined image D formed as mentioned above, an object position (FIG. 11B), and pixel defect information (FIG. 11C). The selector 200c is connected to an a side and the pixel defect information of the combined image D illustrated in FIG. 11C is input to the pixel defect correction unit 200e. The selector 200d is connected to an a side and the data of the combined image D is input to the pixel defect correction unit 200e. In the pixel defect correction unit 200e, the defective pixels of the combined image D are corrected by using the pixel defect information of the combined image D in a manner similar to the processings mentioned above.

FIGS. 12A to 12C are diagrams illustrating positions (FIG. 12A) of the defective pixels of the combined image D in which the defective pixels are corrected, an object position (FIG. 12B), and pixel defect information (FIG. 12C). The selector 200g is connected to a b side and the data of the combined image D after the defective pixels are corrected and the pixel defect information of the combined image D are stored into the RAM 108.

Subsequently, in step S107, the CPU 104 discriminates whether or not the combination of the set number of images is completed. If it is decided as a result of the discrimination that the combination of the set number of images is not completed, the processing routine is returned to step S105 and the processings of steps S105 and S106 are executed. Since three images are combined here, the processing routine is returned to step S105.

In step S105, three images are combined. First, the CPU 104 transfers the data of the combined image D and the data of the image C which are stored in the RAM 108 to the image processing unit 109. As a data input A in FIG. 2, the data of the combined image D is input to the image processing unit 109 and, as a data input B, the data of the image C is input thereto. Thus, the data of the combined image D and the data of the image C are input to the positional difference detection unit 200h. The positional difference detection unit 200h detects the positional difference between the combined image D and the image C. As illustrated in FIGS. 12A to 12C and 8A to 8C, if the addresses of each pixel of the image C are shifted in the X address direction by +2 and in the Y address direction by +2, the object position coincides with the position of the combined image D. Therefore, the positional difference detection unit 200h outputs combination position information (+2, +2).

The image combination unit 200a shifts the addresses of each pixel of the image C in the X address direction by +2 and in the Y address direction by +2 on the basis of the combination position information (+2, +2) which is output from the positional difference detection unit 200h. The image combination unit 200a adds the image C in which the position of each pixel is shifted and the combined image D and outputs a combined image E. After that, in step S106, defective pixels of the combined image E are corrected.

First, the CPU 104 transfers pixel defect information of the combined image D and pixel defect information of the image C to the image processing unit 109. The pixel defect information is input to the image processing unit 109 as pixel defect information inputs A and B illustrated in FIG. 2. The pixel defect information of the combined image D and the pixel defect information of the image C at this time are as illustrated in FIGS. 12C and 8C, respectively. Photographing information of the photographing sensitivity (ISO100) at the time of photographing the image C and the combination position information which is output from the positional difference detection unit 200h are input to the pixel defect information synthesization unit 200b. The pixel defect information of the image C which is input as a pixel defect information input B and the combination position information are input to the address conversion unit 201a. On the basis of the combination position information, the address conversion unit 201a converts the addresses included in the pixel defect information of the image C. FIGS. 13A to 13C are diagrams illustrating an example of positions (FIG. 13A) of defective pixels of the third image (image C) after the addresses are converted, an object position (FIG. 13B), and pixel defect information (FIG. 13C). Since the combination position information at this time is equal to (+2, +2), the addresses included in the pixel defect information of the image C are shifted in the X address direction by +2 and in the Y address direction by +2. Thus, the pixel defect information illustrated in FIG. 8C is converted into the pixel defect information illustrated in FIG. 13C.

After that, the pixel defect information of the combined image D which is input as a defect input A and the pixel defect information (after the conversion) of the image C which is output from the address conversion unit 201a are synthesized. FIG. 14 is a diagram illustrating pixel defect information in which the pixel defect information of the combined image D and the pixel defect information of the image C after the addresses are converted in accordance with the combined image D are synthesized. The data of the synthesized pixel defect information is input to the detection level conversion unit 201c. The photographing information (photographing sensitivity of ISO100) is also input to the detection level conversion unit 201c. Since the defect whose detection level is equal to 100 is already corrected, it is deleted from the pixel defect information illustrated in FIG. 14. The pixel in which the same addresses are shown as pixel defect information is a pixel in which the defects double after the images are combined and it is shown that an output value as a defect is large. Therefore, with respect to such a pixel, the detection level of the pixel defect information is changed higher by one degree. In the example illustrated in FIG. 14, since the defects whose detection levels are equal to 200 double in the pixel of the addresses (7, 9), the detection level is changed to 100 which is higher by one degree.

FIGS. 15A to 15C are diagrams illustrating pixel defect positions (FIG. 15A) of a combined image E formed as mentioned above, an object position (FIG. 15B), and pixel defect information (FIG. 15C). The selector 200c is connected to the a side and the pixel defect information of the combined image E is input to the pixel defect correction unit 200e. The selector 200d is connected to the a side and the data of the combined image E is input to the pixel defect correction unit 200e. In the pixel defect correction unit 200e, the defective pixels of the combined image E are corrected by using the pixel defect information of the combined image E in a manner similar to the foregoing processing.

FIGS. 16A to 16C are diagrams illustrating positions (FIG. 16A) of the defective pixels of the combined image E after the defective pixels are corrected, an object position (FIG. 16B), and pixel defect information (FIG. 16C). Since the image combination is completed, the selector 200g is connected to an a side and the data of the combined image E in which the defective pixels are corrected is compressed by the image compression unit 200f and, thereafter, stored into the RAM 108.

When the combination of all of (three) images A to C is completed, the processing routine advances to step S108. The CPU 104 allows the data of the combined image E stored in the RAM 108 to be recorded into the external recording medium 113. The photographing is finished.

If it is decided as a result of the discrimination of step S101 that the image vibration-proof function is invalid, the processing routine advances to step S109 and the photographing, the correction of the defective pixels, and the recording are executed every image. The operations of steps S109 and S110 are similar to the operations of steps S102 and S103. The image data in which the correction of the defective pixels is finished in step S110 is compressed by the image compression unit 200f and stored into the RAM 108. Finally, in step S111, the CPU 104 allows the image data stored in the RAM 108 to be recorded into the external recording medium 113. The photographing is finished.

As mentioned above, in the embodiment, the pixel defect information including the position (addresses) of the defective pixels and the detection level is preliminarily stored in the image pickup apparatus 100. It is assumed that three images are picked up in order to detect a motion (positional difference). First, a change amount of the second image B to the first image A is derived as combination position information. On the basis of the combination position information, the combined image D is formed by shifting the position of the image B and combining the image B to the image A and the position (addresses) of the pixel defect information of the image B is changed. pixel defect information of the combined image D is formed by synthesizing the pixel defect information of the image A and the pixel defect information of the image B after the change. In this instance, the pixel defect information in which the detection level corresponding to the photographing information (photographing sensitivity of ISO100) is equal to 100 is deleted from the pixel defect information of the combined image D and, at the same time, the detection level of the pixel defect information of the pixel in which the same addresses are shown is raised. By using such pixel defect information, the defective pixels of the combined image D are corrected. Subsequently, with respect to the combined image D and the image C, the same processings as those for the images A and B are executed, pixel defect information of the combined image E of the images A and B is formed, and the defective pixels of the combined image E are corrected. By executing the above processings, when a plurality of images are combined by shifting (adjusting) the positions thereof, if fine defective pixels which are not corrected by the correction of the defective pixels of every image double, only the pixel in which an output value serving as a defect increased can be corrected.

Modification

In the embodiment, when the pixel defect information of the two images are synthesized, only in the case where the addresses coincide in the pixel defect information of those images, the detection level of the defective pixel corresponding to those addresses is changed (raised) so that the defective pixel can be easily detected (corrected). However, it is not always necessary to execute such a processing. For example, even in the case where fine defects exist in the adjacent pixels, they are likely to be conspicuous as defects. Therefore, for example, when the defect information of the two images is synthesized, in the case where a predetermined number of addresses are (continuously) adjacent one after another in the pixel defect information of those images, the detection level of the defective pixel corresponding to those addresses may be changed so that the damaged pixel can be easily detected. Both of the detection level corresponding to the coincident addresses and the detection level corresponding to the adjacent addresses may be changed.

If the number of images to be combined is large as a whole, there is a fear that fine defects are located closely together and image quality of the combined image is deteriorated. Therefore, for example, the detection level included in the pixel defect information may be changed (reduced) in such a manner that the number of fine defects (defective pixels) in a predetermined region after the defective pixels are corrected is equal to or less than a predetermined number (so that the defective pixels become difficult to be detected (corrected)).

Degrees of conspicuousness of defects differ in dependence on pixel outputs (pixel values) of the pixels surrounding the defective pixel. Therefore, in addition to or in place of the change of the detection level mentioned above, for example, a degree of changing the detection level of the defective pixel so that the defective pixel can be easily detected (corrected) may be made different in accordance with the pixel outputs (pixel values) of the pixels surrounding the defective pixel.

Although the embodiment is described with respect to the example of the case where the image data is image data of a Bayer array of RGB, the image data is not limited to such data. The method of the embodiment can be applied to any image data such as image data having luminance and color difference of YUV or the like so long as the position of the pixel defect is changed in dependence on the positional difference of the image.

Although the embodiment is described with respect to the example of the case where the defective pixels are detected with reference to the detection level included in the pixel defect information, the method of detecting the defective pixels is not limited to such a method. For example, it is also possible to use such a method that an output value of the pixel specified by the addresses included in the pixel defect information and a predetermined set detection threshold value are compared and the pixel exceeding the detection threshold value is detected as a defective pixel. In this case, the detection level is not included in the pixel defect information but only address information can be also included therein. In this case, for example, there is used such a construction that on the basis of the combination position information, the addresses included in the pixel defect information of one image are converted in accordance with the other image, their pixel defect information is synthesized, and thereafter, if those addresses coincide or lie within a predetermined condition, the detection threshold value is changed. Such a processing as to enable the damaged pixel to be easily detected is realized not only by changing the detection level but also by changing the detection threshold value.

Second Embodiment

Subsequently, the second embodiment of the invention will be described. Since a fundamental construction of an image pickup apparatus of the embodiment is the construction illustrated in FIG. 1 and is substantially the same as that of the first embodiment, its detailed description is omitted here.

Figure 17:
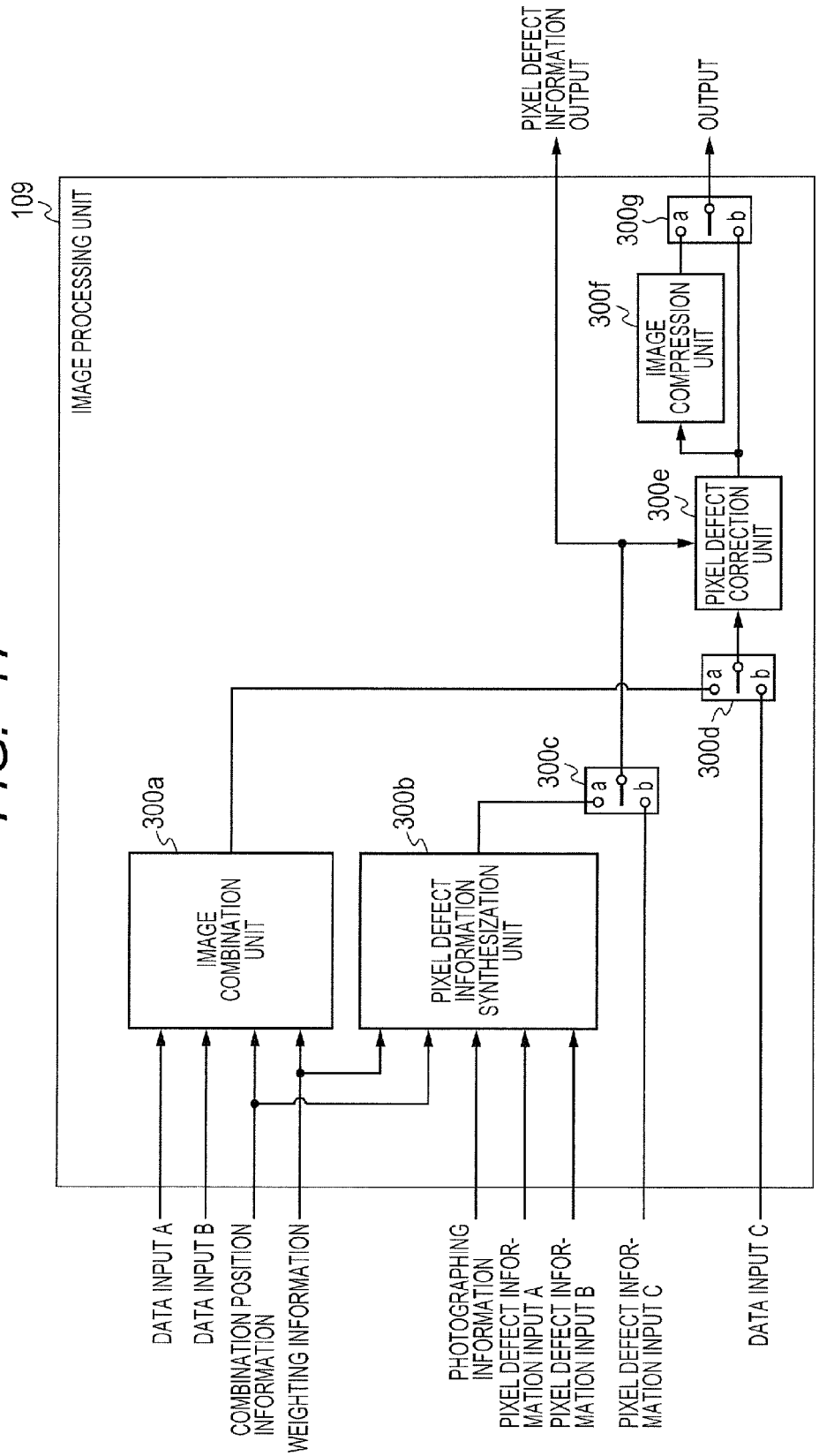
FIG. 17 is a diagram illustrating a construction of an image processing unit of the second embodiment.

FIG. 17 is a diagram illustrating an example of a construction of the image processing unit 109 of the embodiment. An image combination unit 300a combines a plurality of photographed images. In the image combination unit 300a, on the basis of preset combination position information, a predetermined position adjustment processing is executed to a plurality of image data and the images are combined. Although the combination of the images is realized by executing an addition processing of the mutually corresponding pixel data in the embodiment, the image combination method is not limited to such a method.

Also in the embodiment, defective pixels of the image are corrected on the basis of the pixel defect information stored in the ROM 106 in a manner similar to the first embodiment. The pixel defect information is information including a level of the pixel defect and a "position (addresses) on the image pickup element 101" having a damage. A pixel defect correction unit 300e inputs the image data to be subjected to a correction of the pixel defect and the pixel defect information and detects and corrects the pixel defect by processings, which will be described hereinafter.

When a plurality of image data are combined, a pixel defect information synthesization unit 300b forms pixel defect information of the image after the combination on the basis of photographing information and the pixel defect information of the image data to be subjected to the combination and outputs to the pixel defect correction unit 300e. An image compression unit 300f compresses the image when the image is recorded. Each of selectors 300c, 300d, and 300g selects and outputs the image data or the pixel defect information.

Figure 18:
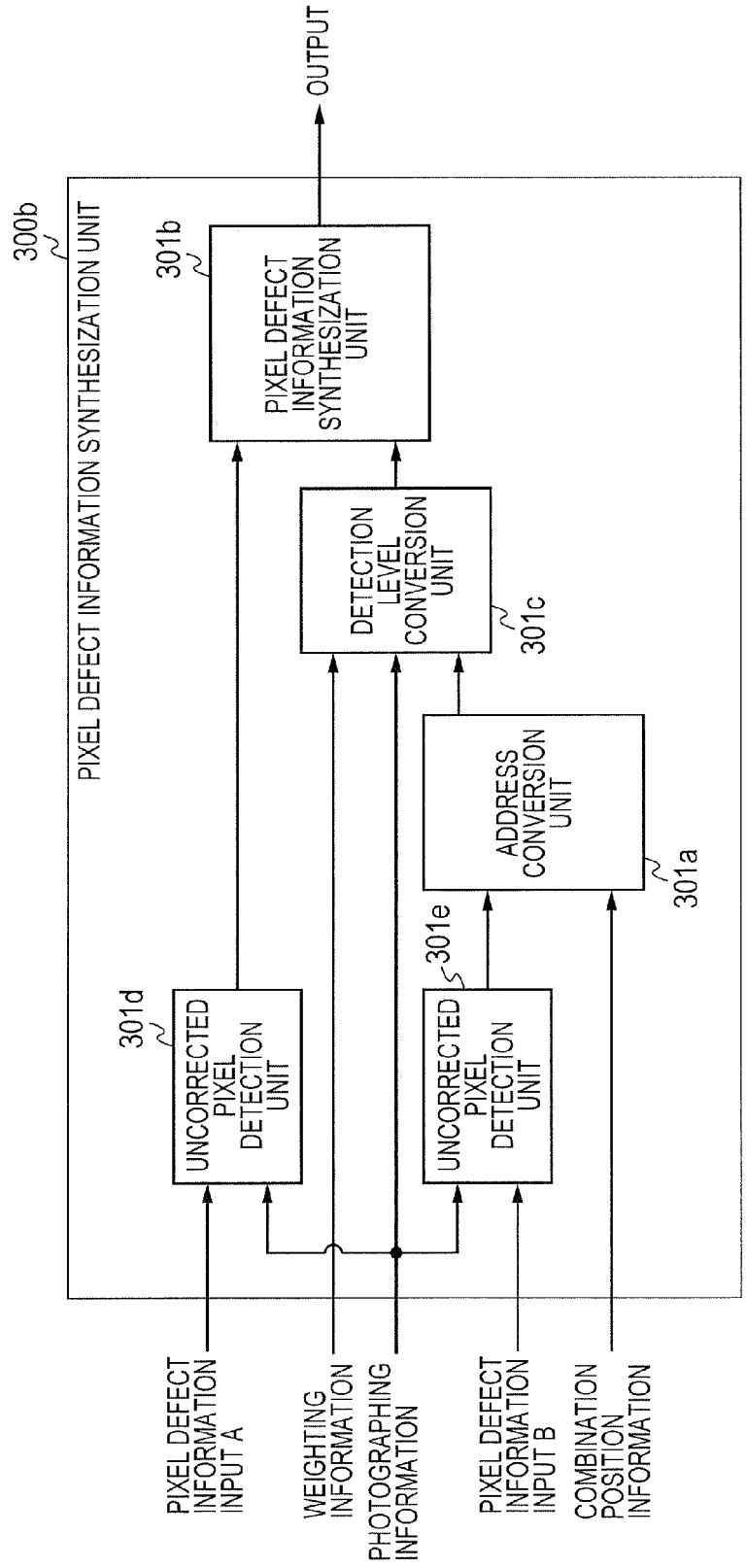
FIG. 18 is a diagram illustrating a construction of a pixel defect information synthesization unit of the second embodiment.

FIG. 18 is a diagram illustrating an example of a construction of the pixel defect information synthesization unit 300b illustrated in FIG. 17. Each of uncorrected pixel detection units 301d and 301e detects uncorrected pixels in the pixel defect information on the basis of the photographing information. An address conversion unit 301a converts addresses of the pixel defect information. A pixel defect information synthesization unit 301b synthesizes a plurality of damage information. A detection level conversion unit 301c changes a detection level in the synthesized pixel defect information on the basis of the photographing information and weighting information at the time of the image combination.

Figure 19:
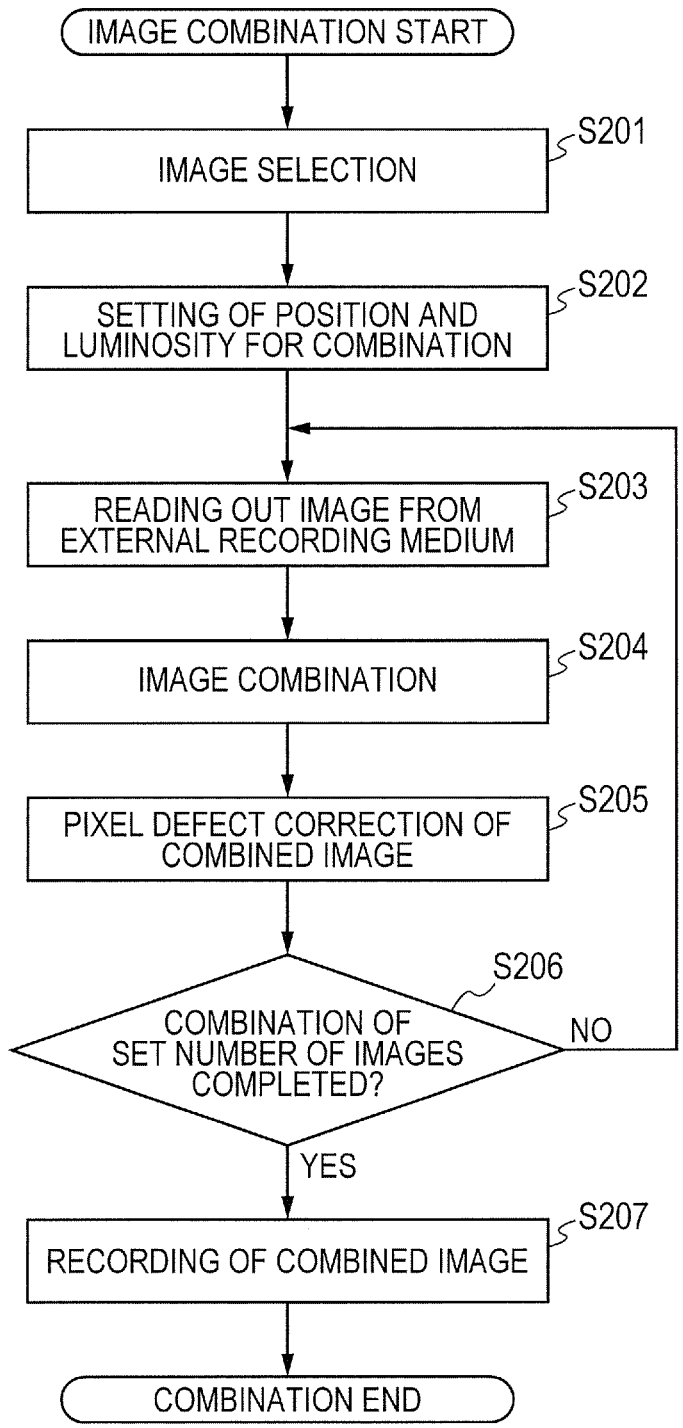
FIG. 19 is a flowchart for describing the operation of the image pickup apparatus of the second embodiment.

Subsequently, an example of the operation of the image pickup apparatus 100 of the embodiment will be described with reference to a flowchart of FIG. 19. In the embodiment, the photographing of the image has previously been performed and the image data is recorded in the external recording medium 113. The processings at the time of photographing are realized by the same processings as steps S109 to S111 described in the first embodiment. The image data in which the defective pixels are corrected is recorded in the external recording medium 113.

Figures 20A, 20B:
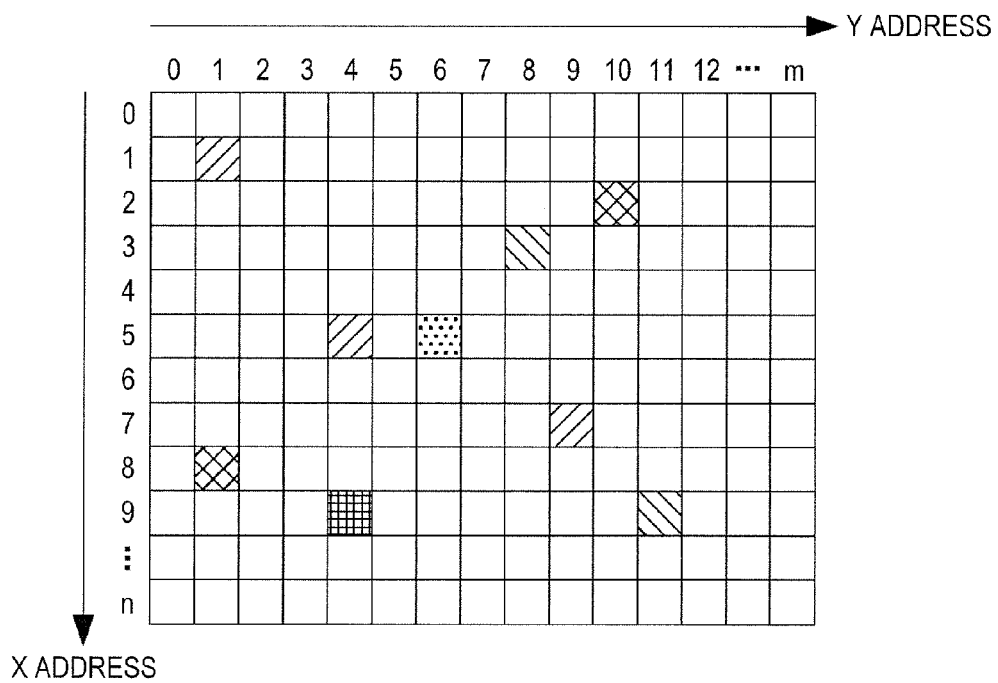
FIGS. 20A and 20B are diagrams illustrating pixel defect positions and pixel defect information.

FIG. 20A illustrates pixel positions (pixel defect positions) on the image pickup element 101. In this figure, one lattice corresponds to one pixel. It is assumed that the pixel position is defined by the X address and the Y address and pixels are arranged every n pixels in the X address and every m pixels in the Y address. In FIG. 20A, pixels in each of which a pattern is drawn are defective pixel. FIG. 20B is a diagram illustrating pixel defect information corresponding to the defective pixels illustrated in FIG. 20A. A pixel defect position shown by the X·Y addresses and a detection level of the pixel defect showing a degree of the pixel defect of each defective pixel are included in the pixel defect information. The larger a value of the detection level is, the smaller an output value as a defective pixel is. In FIG. 20A, the defective pixel is shown by making the pattern different in accordance with the detection level. The correction of the defective pixel at the time of photographing is performed on the basis of the pixel defect information illustrated in FIG. 20B.

In the embodiment, three photographed images are combined. In the following description, the three images are referred to as an image F, an image G, and an image H. The images F, G, and H are images photographed by the photographing sensitivities of ISO100, ISO200, and ISO400, respectively. FIGS. 21A to 23C are diagrams showing examples of positions (FIGS. 21A to 23A) of defective pixels of the images F, G, and H after the defective pixels are corrected, object positions (FIGS. 21B to 23B), and pixel defect information (FIGS. 21C to 23C).

In step S201, the user selects the image combination from a menu displayed in the display unit 107. Images which are recorded in the external recording medium 113 are displayed in the display unit 107. The user selects the images F, G, and H by using the operation unit 105. The operation unit 105 sets a fact that the images F, G, and H are selected by the user into the CPU 104.

Subsequently, in step S202, the user sets the positions of the images F, G, and H at the time of combination by using the operation unit 105. In this instance, it is assumed that the user does not change the position of the image F but sets the positions to the position where the addresses of each pixel of the image G are changed in the X address direction by −2 and in the Y address direction by −2 and to the position where the addresses of each pixel of the image H are changed in the Y address direction by −2. Together with this setting, the user sets the luminosity of each of the images F, G, and H at the time of combination by using the operation unit 105. In this instance, it is assumed that the user sets the luminosity of the image H to a double luminosity. The operation unit 105 sets those contents into the CPU 104.

When the setting of the position and luminosity of each of the images F, G, and H at the time of combination is finished, in step S203, the reading-out of the image is started. The CPU 104 transfers the data of the images F and G stored in the external recording medium 113 to the image processing unit 109. As a data input A illustrated in FIG. 17, the data of the image F is input to the image processing unit 109 and, as a data input B, the data of the image G is input thereto.

Subsequently, in step S204, the three images F, G, and H are combined. First, the CPU 104 transmits combination position information (the X address is changed, the Y address is changed)=(−2, −2) of the image G and luminosity information (luminosity change information) as an example of weighting information to the image processing unit 109. On the basis of the combination position information (−2, −2), the image combination unit 300*a* shifts the addresses of each pixel of the image G in the X address direction by −2 and in the Y address direction by −2. Since the luminosity of the image G is not changed, the image combination unit 300*a* multiplies the luminosity of the image G by 1 time serving as luminosity information, adds the image G in which the addresses of each pixel are shifted and which is multiplied by 1 time as a luminosity and the image F, and outputs a combined image I.

After that, in step S205, the correction (pixel defect correction) of the defective pixels of the combined image I is performed. First, the CPU 104 transfers the pixel defect information of the images F and G to the image processing unit 109. The pixel defect information is input to the image processing unit 109 as pixel defect information inputs A and B illustrated in FIG. 18, respectively. The pixel defect information of the images F and G at this time is as illustrated in FIGS. 21C and 22C, respectively, and is the same as the pixel defect information illustrated in FIG. 20B. Those pixel defect information and the photographing information of the photographing sensitivities (ISO100, ISO200) at the time of photographing the images F and G are input to the uncorrected pixel detection units 301*d* and 301*e* illustrated in FIG. 18, respectively.

The uncorrected pixel detection units 301*d* and 301*e* delete the information of the pixels which are corrected at the time of photographing the images F and G from the pixel defect information. The uncorrected pixel detection units 301*d* and 301*e* also delete the information of the pixels whose addresses are out of a range of the image pickup element from the pixel defect information. FIGS. 24A to 24C and FIGS. 25A to 25C are diagrams showing examples of positions (FIG. 24A, FIG. 25A) of the defective pixels of the images F and G in which the information of the pixels which are corrected at the time of photographing and the information of the pixels existing out of the range of the image pickup element are deleted, object positions (FIG. 24B, FIG. 25B), and pixel defect information (FIG. 24C, FIG. 25C).

After that, an output from the uncorrected pixel detection unit 301*e* and the combination position information are input to the address conversion unit 301*a* illustrated in FIG. 18. The address conversion unit 301*a* converts the addresses included in the pixel defect information of the image G. Since the combination position information at this time is equal to (−2, −2), the addresses included in the pixel defect information of the image G are shifted in the X address direction by −2 and in the Y address direction by −2. FIGS. 26A to 26C are diagrams showing an example of positions (FIG. 26A) of the defective pixels of the image G after the addresses are converted, an object position (FIG. 26B), and pixel defect information (FIG. 26C).

An output from the address conversion unit 301*a* is input to the detection level conversion unit 301*c*. The detection level conversion unit 301*c* converts the detection level of the pixel defect information of the image G. The photographing sensitivity as an example of the photographing condition and the luminosity information as an example of the weighting information are input to the detection level conversion unit 301*c*.

Figures 27A, 27B, 27C:
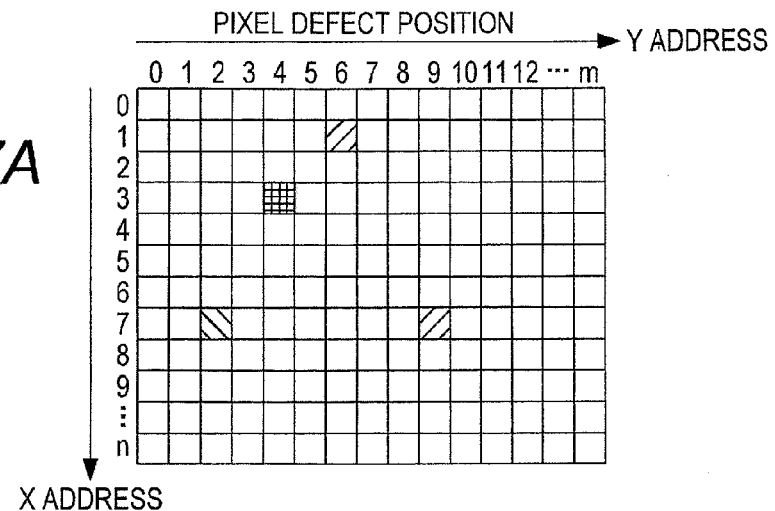
FIGS. 27A, 27B and 27C are diagrams illustrating positions of defective pixels of the image G after a detection level is converted, an object position, and pixel defect information.

Since the image photographed at another photographing sensitivity and a reference of the pixel defect detection need to be handled in common at the time of the synthesization of the pixel defect information, which will be described hereinafter, the detection level of the pixel defect information of the image G has to be converted into the photographing sensitivity of ISO100. Since the image G is photographed at the photographing sensitivity of ISO200, the detection level conversion unit 301c sets the detection level of the image G so as to be higher by one degree. Further, when the images are combined by raising the luminosity, since the output value as a defective pixel increases, it is necessary to raise the detection level by an amount corresponding to the increased luminosity. Since the luminosity (luminosity information) of the image G is set to 1 time, there is no change in detection level here. Therefore, the detection level conversion unit 301c converts the detection level of the image G so as to be higher by one degree by adding a conversion amount for the photographing sensitivity and a conversion amount for the luminosity. FIGS. 27A to 27C are diagrams showing an example of positions (FIG. 27A) of the defective pixels of the image G after the detection level is converted, an object position (FIG. 27B), and pixel defect information (FIG. 27C).

After that, the pixel defect information synthesization unit 301b synthesizes the pixel defect information of the image F illustrated in FIG. 24C and the pixel defect information of the image G illustrated in FIG. 27C. The pixel in which the same (two) addresses are shown as pixel defect information is a pixel in which the defects double after the images are combined and it is shown that an output value as a defect is large. Therefore, with respect to such a pixel, the detection level of the pixel defect information is changed higher by one degree. In this case, since the pixel of the addresses (7, 9) is a pixel in which the defects whose detection levels are equal to 200 double, the detection level is changed to 100 which is higher by one degree.

FIGS. 28A to 28C are diagrams illustrating pixel defect positions (FIG. 28A) of a combined image I formed as mentioned above, an object position (FIG. 28B), and pixel defect information (FIG. 28C). The selector 300c is connected to an a side and the pixel defect information of the combined image I illustrated in FIG. 28C is input to the pixel defect correction unit 300e. The selector 300d is connected to an a side and the data of the combined image I is input to the pixel defect correction unit 300e. In the pixel defect correction unit 300e, the defective pixels of the combined image I are corrected by using the pixel defect information in a manner similar to the processing of the pixel defect correction unit 200e.

FIGS. 29A to 29C are diagrams illustrating positions (FIG. 29A) of the defective pixels of the combined image I after the defective pixels are corrected, an object position (FIG. 29B), and pixel defect information (FIG. 29C). The selector 300g is connected to a b side and the data of the combined image I in which the defective pixels are corrected and the pixel defect information of the combined image I are stored into the RAM 108.

Subsequently, in step S206, the CPU 104 discriminates whether or not the combination of the set number of images is completed. If it is decided as a result of the discrimination that the combination of the set number of images is not completed, the processing routine is returned to step S203 and the processings of steps S203 and S205 are executed. Since three images are combined here, the processing routine is returned to step S203.

In step S203, the reading-out of the next image is started. First, the CPU 104 transfers the data of the combined image I and the data of the image H which are stored in the external recording medium 113 to the image processing unit 109. As a data input A in FIG. 17, the data of the combined image I is input to the image processing unit 109 and, as a data input B, the data of the image H is input thereto.

Subsequently, in step S204, the combined image I and the image H are combined. First, the CPU 104 transmits combination position information (the X address is changed, the Y address is changed)=(0, −2) of the image H and luminosity information (luminosity change information) as an example of the weighting information to the image processing unit 109. On the basis of the combination position information (0, −2), the image combination unit 300a shifts the addresses of each pixel of the image H in the Y address direction by −2. Since the image H is combined by doubling the luminosity thereof, the image combination unit 300a multiplies the luminosity of the image H by 2 times serving as luminosity information. The image combination unit 300a adds the image H in which the addresses of each pixel are shifted and which is multiplied by 2 times as a luminosity and the combined image I, and outputs a combined image J.

After that, in step S205, the correction of the defective pixels of the combined image J is performed. First, the CPU 104 transfers the pixel defect information of the combined image I and the pixel defect information of the image H to the image processing unit 109. The pixel defect information is input to the image processing unit 109 as pixel defect information inputs A and B illustrated in FIG. 18, respectively. The pixel defect information of the combined image I and the pixel defect information of the image H at this time are as illustrated in FIGS. 29C and 23C, respectively. Those pixel defect information and the photographing information of the photographing sensitivity (ISO400) at the time of photographing the image H are input to the uncorrected pixel detection units 301d and 301e illustrated in FIG. 18, respectively.

The uncorrected pixel detection unit 301d deletes the information of the pixels which are corrected at the time of combination of the combined image I from the pixel defect information. When the combined image I is combined, since the detection level is discriminated by using the photographing sensitivity of ISO100 as a reference, the information of the pixels whose detection levels are equal to 100 are deleted from the pixel defect information. The uncorrected pixel detection unit 301e also deletes the information of the pixels whose addresses are out of the range of the image pickup element from the pixel defect information. FIGS. 30A to 30C are diagrams showing an example of positions (FIG. 30A) of the defective pixels of the image H in which the information of the pixels which are corrected at the time of photographing and the information of the pixels existing out of the range of the image pickup element are deleted, an object position (FIG. 30B), and pixel defect information (FIG. 30C). FIG. 31 is a diagram showing an example of positions (FIG. 31A) of the defective pixels of the combined image I in which the information of the pixels which are corrected at the time of combination of the combined image I is deleted, an object position (FIG. 31B), and pixel defect information (FIG. 31C).

After that, an output from the uncorrected pixel detection unit 301e and the combination position information are input to the address conversion unit 301a illustrated in FIG. 18. The address conversion unit 301a converts the addresses included in the pixel defect information of the image H. Since the combination position information at this time is equal to (0, −2), the addresses included in the pixel defect information of the image H are shifted in the Y address direction by −2. FIGS. 32A to 32C are diagrams showing an example of positions (FIG. 32A) of the defective pixels of the image H after the addresses are converted, an object position (FIG. 32B), and pixel defect information (FIG. 32C).

The output from the address conversion unit 301*a* is input to the detection level conversion unit 301*c*. The detection level conversion unit 301*c* converts the detection level of the pixel defect information of the image H. The photographing sensitivity as an example of the photographing information and the luminosity information as an example of the weighting information are input to the detection level conversion unit 301*c*. Since the image photographed at another photographing sensitivity and the reference of the pixel defect detection need to be handled in common at the time of synthesizing the pixel defect information as mentioned above, it is necessary that the detection level of the pixel defect information of the image H is converted into the photographing sensitivity of ISO100. Since the image H is photographed at the photographing sensitivity of ISO400, the detection level of the image H is set to be higher by two degrees. Further, when the images are combined by raising the luminosity, since the output value as a defective pixel increases, it is necessary to raise the detection level by an amount corresponding to the increased luminosity. Since the luminosity (luminosity information) of the image H is set to 2 times, the detection level is set to be higher by one degree. Therefore, the detection level conversion unit 301*c* converts the detection level so as to be higher by three degrees by adding the conversion amount for the photographing sensitivity and the conversion amount for the luminosity. FIGS. 33A to 33C are diagrams showing an example of positions (FIG. 33A) of the defective pixels of the image H after the detection level is converted, an object position (FIG. 33B), and pixel defect information (FIG. 33C).

After that, the pixel defect information synthesization unit 301*b* synthesizes the pixel defect information of the combined image I illustrated in FIG. 31C and the pixel defect information of the image H illustrated in FIG. 33C. As mentioned above, the pixel in which the same (two) addresses are shown as pixel defect information is a pixel in which the defects double after the images are combined and it is shown that an output value as a defect is large. Therefore, with respect to such a pixel, the detection level of the pixel defect information is changed higher by one degree. In the examples illustrated in FIGS. 31A to 31C and FIGS. 33A to 33C, since the pixel of the addresses (5, 4) is a pixel in which the defects whose detection levels are equal to 200 double, the detection level is changed to 100 which is higher by one degree.

FIGS. 34A to 34C are diagrams illustrating positions (FIG. 34A) of the defective pixels of a combined image J formed as mentioned above, an object position (FIG. 34B), and pixel defect information (FIG. 34C). The selector 300*c* is connected to the a side and the pixel defect information of the combined image J illustrated in FIG. 34C is input to the pixel defect correction unit 300*e*. The selector 300*d* is connected to the a side and the data of the combined image J is input to the pixel defect correction unit 300*e*. In the pixel defect correction unit 300*e*, the defective pixels of the combined image J are corrected by using the pixel defect information in a manner similar to the processing of the pixel defect correction unit 200*e* described in the first embodiment.

FIGS. 35A to 35C are diagrams illustrating positions (FIG. 35A) of the defective pixels of the combined image J after the defective pixels are corrected, an object position (FIG. 35B), and pixel defect information (FIG. 35C). Since the combination of the images is now completed, the selector 300*g* is connected to an a side, the data of the combined image J in which the defective pixels are corrected is compressed by the image compression unit 300*f*, and thereafter, stored into the RAM 108.

Thus, since it is determined in step S206 that the combination of the set number of images is completed, in step S207, the CPU 104 allows the data of the combined image J stored in the RAM 108 to be recorded into the external recording medium 113. The combination of the images is finished.

As mentioned above, in the embodiment, the pixel defect information including the positions (addresses) of the defective pixels and the detection level is preliminarily stored in the image pickup apparatus 100. In the case of combining the three images F, G, and H which are already recorded in the external recording medium, the addresses of each pixel of the images G and H are shifted so as to be matched with the image F on the basis of a designation by the user, and the luminosities of the images F, G, and H are changed. First, the addresses of each pixel of the image G in which the luminosity is changed are shifted so as to be matched with the image F, the combined image I of the images G and F is formed, and at the same time, the position (addresses) of the pixel defect information of the image G is changed. The detection level of the pixel defect information of the image G is changed in accordance with the photographing sensitivity and the luminosity of the image F. Pixel defect information of the combined image I is formed by synthesizing the pixel defect information of the image G in which the detection level and the position (addresses) are changed and the pixel defect information of the image F. At this time, the detection level of the pixel defect information of the pixels shown by the same addresses is raised. The defective pixels of the combined image I are corrected by using the pixel defect information. With respect to the combined image I and the image H, the same processings as those for the images F and G are executed, pixel defect information of the combined image J of the combined image I and the image H is formed, and the defective pixels of the combined image J are corrected. By executing the processings as mentioned above, when a plurality of images are combined by shifting the positions thereof, if the fine defects which are not corrected by the pixel defect correction of every image double, only the pixels whose output values serving as defects are large can be corrected correspondingly to the photographing condition and combination condition.

Also in the embodiment, various modifications described in the first embodiment can be used.

Although the exemplary embodiments of the invention are described above, the invention is not limited to those embodiments but various modifications and changes within the scope of the spirit of the invention are possible.

The foregoing embodiments are nothing but the specific examples for embodying the invention and the technical scope of the invention should not be limitedly interpreted by them. That is, the invention can be embodied by various forms without departing from its technical idea or its main features.

Other Embodiments

The invention is realized by executing the following processings. That is, first, software (computer program) for realizing the functions of the embodiments mentioned above is supplied to a system or an apparatus through a network or various kinds of storage media, and a computer (or a CPU, MPU, or the like) of the system or apparatus reads out the computer program and executes processings on the basis of the computer program.

While the present invention is described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-146322 filed on Jun. 30, 2011, which is hereby incorporated by reference herein in its entirety.

What is claimed is:

1. An image pickup apparatus comprising:
a combination unit configured to combine a plurality of photographed images by using an image pickup element;
a change unit configured to, in the case where pixel positions of defective pixels in each of the plurality of images which are to be combined by the combination unit coincide, change defect level information showing a level of a defect of the defective pixel in a combined image; and
a correction unit configured to, on the basis of the defect level information before it is changed by the change unit, correct the defective pixels in each of the plurality of images which are to be combined by the combination unit and, on the basis of the defect level information changed by the change unit, correct the defective pixels in the image combined by the combination unit.

2. An apparatus according to claim 1, wherein the pixel defect information includes information showing a position of the defective pixel in the image pickup element and information showing a size of a defect of the defective pixel,
wherein the change unit further changes information indicating a size of a defect of the defective pixel which is specified by the pixel defect information of each of the plurality of images which are to be combined by the combination unit, that is, the change unit further changes information indicating a size of a defect of one of the defective pixels which are both located at a same position, and information indicating a size of a defect of one of the defective pixels which are located at respective positions mutually adjacent to each other, and
wherein after the pixel defect information is changed by the change unit, on the basis of the pixel defect information, the correction unit corrects the defective pixels in the image combined by the combination unit.

3. An apparatus according to claim 2, wherein the change unit changes the information indicating the size of the defect of the defective pixel included in the pixel defect information of the plurality of images which are to be combined by the combination unit in such a manner that the number of defective pixels which are corrected by the correction unit and which exist in a predetermined region is equal to or less than a predetermined number.

4. An apparatus according to claim 2, further comprising a detection unit configured to detect the defect information of the plurality of images which are to be combined by the combination unit,
wherein on the basis of a photographing condition, the change unit changes information indicating a size of a defect of the defective pixel which is specified by the pixel defect information of each of the plurality of images which are to be combined by the combination unit, and is at least one of the defective pixels which are both located at a same position or are located at respective positions mutually adjacent to each other, such that the detection unit readily detects the defective pixel.

5. An apparatus according to claim 4, wherein the photographing condition includes a photographing sensitivity.

6. An apparatus according to claim 2, further comprising a detection unit configured to detect the defect information of the plurality of images which are to be combined by the combination unit,
wherein on the basis of weighting information to a size of a pixel value of the image, the change unit changes information indicating a size of a defect of the defective pixel which is specified by the pixel defect information of each of the plurality of images which are to be combined by the combination unit, and is at least one of the defective pixels which are both located at a same position or are located at respective positions mutually adjacent to each other, such that the detection unit readily detects the defective pixel.

7. An apparatus according to claim 6, wherein the weighting information includes a luminosity.

8. An apparatus according to claim 3, further comprising a detection unit configured to detect the defect information of the plurality of images which are to be combined by the combination unit,
wherein in accordance with a pixel value of a pixel surrounding the defective pixel, the change unit changes information indicating a size of a defect of the defective pixel which is specified by the pixel defect information of each of the plurality of images which are to be combined by the combination unit, and is at least one of the defective pixels which are both located at a same position, or are located at respective positions mutually adjacent to each other, such that the detection unit readily detects the defective pixel.

9. An apparatus according to claim 1, further comprising a detection unit configured to detect the defect information of the plurality of images which are to be combined by the combination unit,
wherein the pixel defect information includes information indicating a position of the defective pixel in the image pickup element, and
wherein the detection unit detects the defective pixel by using the information indicating the position of the defective pixel in the image pickup element included in the pixel defect information and a result of a comparison between a pixel value of the defective pixel and a detection threshold value.

10. An apparatus according to claim 9, wherein after the pixel defect information is changed by the change unit, if at least one of information indicating positions of the defective pixels which are both located at a same position and information indicating positions of the defective pixels which are located at respective positions mutually adjacent to each other is included in the pixel defect information of each of the plurality of images which are to be combined by the combination unit, the detection unit changes the detection threshold value, such that the correction unit readily corrects the pixel value of the defective pixel.

11. An apparatus according to claim 10, wherein on the basis of a photographing condition, the detection unit changes the detection threshold value such that the correction unit readily corrects the pixel value of the defective pixel.

12. An apparatus according to claim 11, wherein the photographing condition includes a photographing sensitivity.

13. An apparatus according to claim 10, wherein on the basis of weighting information to a size of a pixel value of the image, the detection unit changes the detection threshold value such that the correction unit readily corrects the pixel value of the defective pixel.

14. An apparatus according to claim 13, wherein the weighting information includes a luminosity.

15. An apparatus according to claim 10, wherein in accordance with a pixel value of a pixel surrounding the defective pixel, the detection unit changes the detection threshold value such that the detection unit readily detects the defective pixel.

16. An apparatus according to claim 1, further comprising a forming unit configured to form combination position information including a change amount of a position of each pixel of each image at the time of combining a plurality of images in accordance with a result of a detection of a positional difference among the plurality of images or a result of an operation of an operation unit.

17. An image combination method comprising:
a combination step of combining a plurality of photographed images by using an image pickup element;
a change step of, in the case where pixel positions of defective pixels in each of the plurality of images which are to be combined by the combination step coincide, changing defect level information showing a level of a defect of the defective pixel in a combined image; and
a correction step of, on the basis of the defect level information before it is changed by the change step, correcting the defective pixels in each of the plurality of images which are to be combined by the combination step and, on the basis of the defect level information changed by the change step, correcting the defective pixels in the image combined by the combination step.

18. A non-transitory computer-readable storage medium storing a computer program for allowing a computer to execute:
a combination step of combining a plurality of photographed images by using an image pickup element;
a change step of, in the case where pixel positions of defective pixels in each of the plurality of images which are to be combined by the combination step coincide, changing defect level information showing a level of a defect of the defective pixel in a combined image; and
a correction step of, on the basis of the defect level information before it is changed by the change step, correcting the defective pixels in each of the plurality of images which are to be combined by the combination step and, on the basis of the defect level information changed by the change step, correcting the defective pixels in the image combined by the combination step.

* * * * *